(12) United States Patent
Tamaki et al.

(10) Patent No.: US 10,465,935 B2
(45) Date of Patent: Nov. 5, 2019

(54) AIR-CONDITIONING APPARATUS

(71) Applicant: Mitsubishi Electric Corporation, Tokyo (JP)

(72) Inventors: Shogo Tamaki, Tokyo (JP); Shinichi Ito, Tokyo (JP); So Nomoto, Tokyo (JP); Hirofumi Koge, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 110 days.

(21) Appl. No.: 15/788,977

(22) Filed: Oct. 20, 2017

(65) Prior Publication Data

US 2019/0120513 A1 Apr. 25, 2019

(51) Int. Cl.

| | |
|---|---|
| *F24F 11/00* | (2018.01) |
| *F24F 11/30* | (2018.01) |
| *F24F 11/62* | (2018.01) |
| *F24F 11/83* | (2018.01) |
| *F24F 3/153* | (2006.01) |
| *F24F 12/00* | (2006.01) |
| *F24F 140/60* | (2018.01) |
| *F24F 11/64* | (2018.01) |
| *F24F 11/46* | (2018.01) |
| *F24F 110/10* | (2018.01) |

(Continued)

(52) U.S. Cl.
CPC ............ *F24F 11/30* (2018.01); *F24F 3/153* (2013.01); *F24F 11/62* (2018.01); *F24F 11/83* (2018.01); *F24F 12/006* (2013.01); *F24F 11/46* (2018.01); *F24F 11/64* (2018.01); *F24F 2110/10* (2018.01); *F24F 2110/12* (2018.01); *F24F 2140/20* (2018.01); *F24F 2140/60* (2018.01); *F25B 2500/02* (2013.01)

(58) Field of Classification Search
CPC ........ F24F 11/46; F24F 11/64; F24F 2140/00; F24F 2140/60; F25B 2500/02
See application file for complete search history.

(56) References Cited

U.S. PATENT DOCUMENTS

| | | | |
|---|---|---|---|
| 2011/0005245 A1* | 1/2011 | Pussell | F24D 11/0214 62/89 |
| 2014/0374497 A1* | 12/2014 | Nikaido | F24F 11/89 236/1 C |
| 2016/0341434 A1 | 11/2016 | Kojima | |

(Continued)

FOREIGN PATENT DOCUMENTS

JP 2015-145759 A 8/2015

*Primary Examiner* — Jonathan Bradford
(74) *Attorney, Agent, or Firm* — Posz Law Group, PLC

(57) ABSTRACT

An air-conditioning apparatus includes; a first heat source device configured to transfer heat to process air using as a heat source a vapor-compression refrigeration cycle; a second heat source device configured to transfer heat to the process air using an other heat source different from the vapor-compression refrigeration cycle; and a controller configured to control the first heat source device and the second heat source device. The controller deactivates the first heat source device and activates the second heat source device when, during a period in which the first heat source device is being operated to heat the process air, a temperature of the heated process air is kept at a target temperature and a parameter indicating an energy consumption of the first heat source device exceeds a first threshold value.

17 Claims, 13 Drawing Sheets

(51) Int. Cl.
  *F24F 110/12* (2018.01)
  *F24F 140/20* (2018.01)

(56) References Cited

U.S. PATENT DOCUMENTS

2016/0377309 A1* 12/2016 Abiprojo .............. G05B 19/042
                                                    700/276
2017/0102723 A1*  4/2017 Smith ..................... H04L 12/28

* cited by examiner

AIR-CONDITIONING APPARATUS

TECHNICAL FIELD

The present invention relates to an air-conditioning apparatus including a heat source device configured to heat process air using as a heat source a vapor-compression refrigeration cycle, and another heat source device configured to heat the process air using another heat source different from the heat source of the vapor-compression refrigeration cycle.

BACKGROUND ART

Hitherto, there exists an air-conditioning system including a heat pump unit that performs indoor heating using a vapor-compression refrigeration cycle and an other heat source unit that performs indoor heating using a heat source different from a heat source of the heat pump unit. As the air-conditioning system described above, the following technology has been proposed. Specifically, when there is satisfied a first switching condition that an outside air temperature reaches a first switching outside air temperature and a heating capacity of the heat pump unit reaches an upper limit during a period in which a heat pump heating operation is being performed, the heat pump heating operation is switched to an other heat source heating operation for performing indoor heating using the other heat source unit (see, for example, Japanese Unexamined Patent Application Publication No. 2015-145759).

CITATION LIST

Patent Literature

Patent Literature 1: Japanese Unexamined Patent Application Publication No. 2015-145759 (claim 1)

SUMMARY OF INVENTION

Technical Problem

The air-conditioning system disclosed in Japanese Unexamined Patent Application Publication No. 2015-145759 switches the heat pump heating operation to the other heat source heating operation on condition that the outside air temperature reaches the first switching outside air temperature and the heating capacity of the heat pump unit reaches the upper limit. In this manner, even when the heating capacity is insufficient in the heat pump heating operation, heating is performed so that an indoor temperature becomes closer to a target indoor temperature through the other heat source heating operation. As a result, it is considered that indoor comfort is improved.

In the air-conditioning system disclosed in Japanese Unexamined Patent Application Publication No. 2015-145759, however, the heat pump heating operation is continued until the heating capacity of the heat pump unit reaches the upper limit. Thus, the air-conditioning system is sometimes operated under a state in which a primary energy consumption is large. For example, even under a situation in which an air-conditioning load is relatively small and a coefficient of performance (COP) is small, the heat pump heating operation is continued unless the heating capacity of the heat pump unit reaches the upper limit. A primary energy consumption when the heat pump heating operation is performed under a small COP state may be larger than a primary energy consumption when the other heat source heating operation is performed.

In some regions, an energy cost (e.g., dollar/MJ or yen/MJ) sometimes differs for each kind of energy for driving the heat source device. For example, in a region in which an energy cost for driving the other heat source unit disclosed in Japanese Unexamined Patent Application Publication No. 2015-145759 is smaller than an energy cost of electricity for driving the heat pump unit, a running cost disadvantageously increases when the heat pump heating operation is continued under a small COP state as compared to a running cost when the other heat source heating operation is performed.

The present invention has been made in the context of the problems described above, and has an object to provide an air-conditioning apparatus capable of suppressing an increase in primary energy consumption and an increase in running cost.

Solution to Problem

According to one embodiment of the present invention, there is provided an air-conditioning apparatus including: a first heat source device configured to transfer heat to process air using as a heat source a vapor-compression refrigeration cycle; a second heat source device configured to transfer heat to the process air using an other heat source different from the heat source of the vapor-compression refrigeration cycle; and a controller configured to control the first heat source device and the second heat source device, the controller being configured to deactivate the first heat source device and activate the second heat source device when, during a period in which the first heat source device is being operated to heat the process air, a temperature of the heated process air is kept at a target temperature and a parameter indicating an energy consumption of the first heat source device exceeds a first threshold value.

Advantageous Effects of Invention

According to one embodiment of the present invention, when the temperature of the process air is kept at the target temperature during the period in which the first heat source device is being operated, the operation using the first heat source device is switched to the operation using the second heat source device based on the parameter indicating the energy consumption of the first heat source device. Here, a state in which the temperature of the process air is kept at the target temperature can be considered as a state in which an operating capacity of the first heat source device has not reached an upper limit of the operating capacity and its COP is relatively large. The operation using the second heat source device is started based on the parameter indicating the energy consumption of the first heat source device when the temperature of the process air is kept at the target temperature, thus, the first heat source device can be prevented from being operated at a relatively small COP. Therefore, an increase in primary energy consumption and an increase in running cost can be suppressed.

DESCRIPTION OF EMBODIMENTS

Now, an air-conditioning apparatus according to embodiments of the present invention is described with reference to the accompanying drawings. The relationships between the sizes of components in the following drawings may be different from the actual relationships. Further, in the following drawings, components denoted by the same reference symbols correspond to the same or equivalent components. This is common throughout the description herein. In addition, the forms and arrangements of the components described herein are merely examples, and the present invention is not limited to the particular embodiments.

Embodiment 1

<System Configuration>

Figure 1:
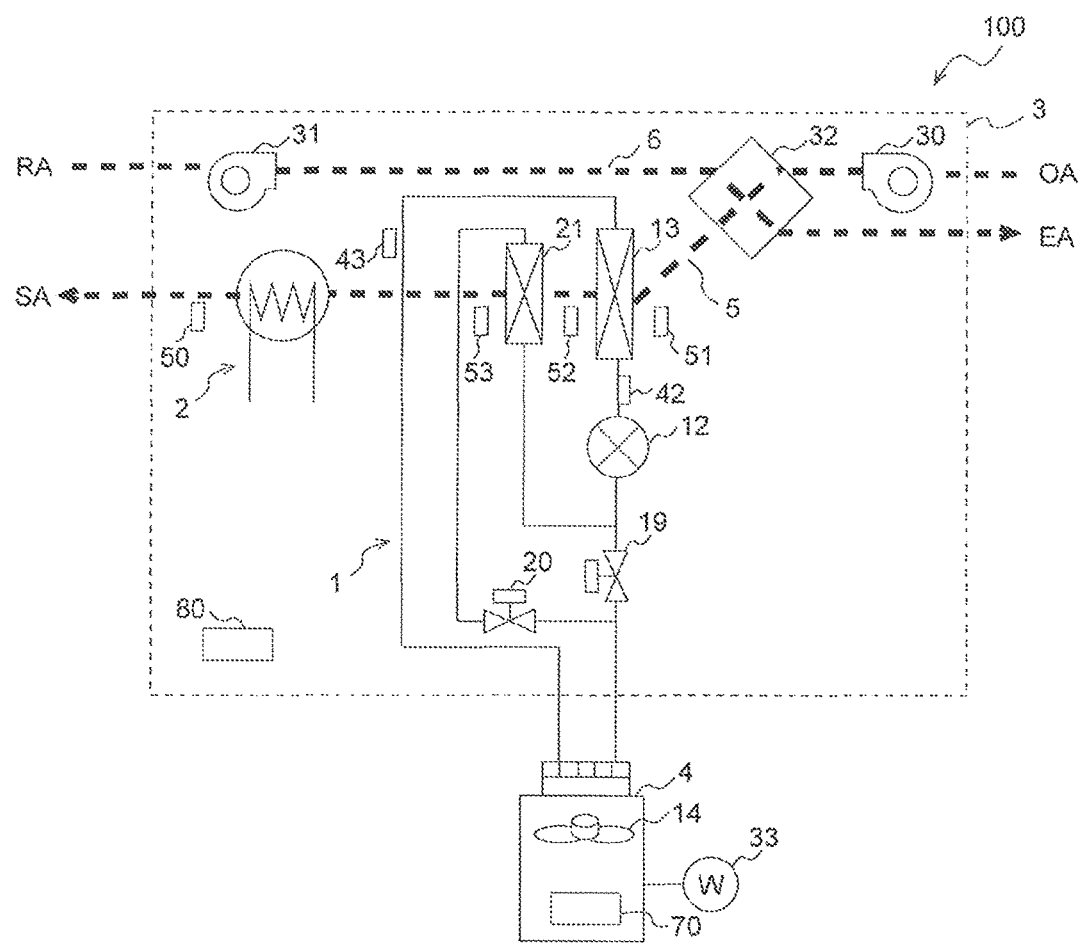
FIG. 1 is a schematic diagram of a system configuration of an air-conditioning apparatus according to Embodiment 1 of the present invention.

FIG. 1 is a schematic diagram of a system configuration of an air-conditioning apparatus 100 according to Embodiment 1 of the present invention. The air-conditioning apparatus 100 according to Embodiment 1 is installed in a building, for example, an office building or a store building. The air-conditioning apparatus 100 is a system configured to ventilate an indoor space and perform air-conditioning to cool and heat air to supply the cooled or heated air to the indoor space.

The air-conditioning apparatus 100 includes a use-side casing 3 and a heat source-side casing 4. The use-side casing 3 is installed indoors or at a location, for example, above a ceiling of a room, which communicates to the indoor space. Devices included in the air-conditioning apparatus 100 are accommodated in any of the use-side casing 3 and the heat source-side casing 4. The use-side casing 3 and the heat source-side casing 4 are connected to each other by refrigerant pipes. The heat source-side casing 4 of Embodiment 1 is installed outdoors.

Inside the use-side casing 3, a supply air passage 5 and an exhaust air passage 6 are formed. The supply air passage 5 is configured to supply, as supply air (SA), outdoor air (OA) to the indoor space. The exhaust air passage 6 is configured to exhaust, as exhaust air (EA), return air (RA), which is sucked in from the indoor space, to an outdoor space. The RA is exhausted as the EA, whereas the OA is supplied as the SA to the indoor space, thereby ventilating the indoor space. A supply air fan 30 is installed in the supply air passage 5, whereas an exhaust air fan 31 is installed in the exhaust air passage 6.

A total heat exchanger 32 configured to allow air flowing through the supply air passage 5 and air flowing through the exhaust air passage 6 to exchange heat therebetween is provided in the use-side casing 3. The total heat exchanger 32 may be of rotary type or static type.

The air-conditioning apparatus 100 according to Embodiment 1 includes a first heat source device 1 and a second heat source device 2 as devices configured to condition process air. The process air is the OA in Embodiment 1. The first heat source device 1 cools or heats the process air flowing through the supply air passage 5 with a function of a heat pump of a refrigeration cycle. The second heat source device 2 heats the process air flowing through the supply air passage 5 with a heat source different from the refrigeration cycle. Any of the first heat source device 1 and the second heat source device 2 is used to heat the process air flowing through the supply air passage 5.

<Configuration of Second Heat Source Device 2>

The second heat source device 2 is a heating device, for example, a gas furnace or a kerosene burner. A device using a heat source other than the heat source of the refrigeration cycle is used as the second heat source device 2.

<Configuration of First Heat Source Device 1>

Figure 2:
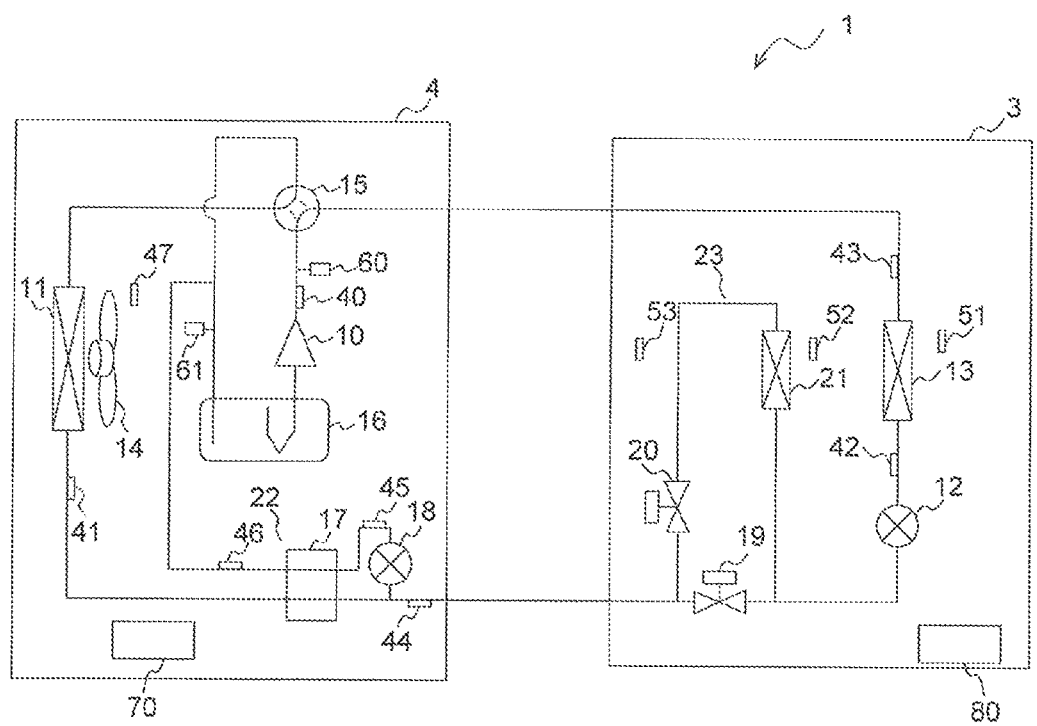
FIG. 2 is a schematic diagram of a system configuration of a first heat source device of Embodiment 1.

FIG. 2 is a schematic diagram of a system configuration of the first heat source device 1 of Embodiment 1. FIG. 2 is an illustration of devices constructing the first heat source device 1 included in the air-conditioning apparatus 100 illustrated in FIG. 1. With reference to FIG. 1 and FIG. 2, a configuration of the first heat source device 1 is described.

The first heat source device 1 includes a compressor 10, a first heat exchanger 11, a decompression mechanism 12, and a second heat exchanger 13. The compressor 10, the first heat exchanger 11, the decompression mechanism 12, and the second heat exchanger 13 are connected by refrigerant pipes to construct a refrigerant circuit. Refrigerant circulates through the refrigerant circuit to form a vapor-compression refrigeration cycle. Further, the first heat source device 1 includes a fan 14 configured to supply air to the first heat exchanger 11.

The compressor 10 can be constructed of, for example, a rotary compressor, a scroll compressor, a screw compressor, a reciprocating compressor, or other types of compressors. The compressor 10 may also be constructed of a capacity-controllable inverter compressor. The output of the compressor 10 exemplified in Embodiment 1 is controlled by adjusting its drive frequency.

Each of the first heat exchanger 11 and the second heat exchanger 13 functions as an evaporator or a condenser. For example, each of the first heat exchanger 11 and the second heat exchanger 13 is constructed of a fin-and-tube heat exchanger, a micro-channel heat exchanger, or other types of heat exchangers.

The fan 14 is constructed of, for example, a propeller fan having a plurality of blades. The fan 14 exemplified in Embodiment 1 is configured to have a controllable rotation speed. The fan 14 is accommodated in the heat source-side casing 4.

More preferably, the first heat source device 1 of Embodiment 1 includes a four-way valve 15, an accumulator 16, a subcooling circuit 22, and a reheating circuit 23. The four-way valve 15 includes a valve body therein, and switches an open/closed state of the valve body to change a direction of flow of refrigerant discharged from the compressor 10 and a direction of flow of refrigerant sucked into the compressor 10. The function of the four-way valve 15 may be achieved by combining two-way valves or three-way valves. The accumulator 16 is provided to the refrigerant circuit on a suction side of the compressor 10, and is configured to store surplus refrigerant in the refrigerant circuit.

The subcooling circuit 22 is a circuit configured to subcool the refrigerant flowing out of the first heat exchanger 11 when the first heat exchanger 11 functions as the condenser. The subcooling circuit 22 includes a refrigerant pipe, which branches from a refrigerant pipe between the first heat exchanger 11 and the decompression mechanism 12 to join a refrigerant pipe on an inlet side of the accumulator 16. The subcooling circuit 22 includes a decompression mechanism 18 configured to decompress refrigerant flowing through the refrigerant pipe branching from the refrigerant pipe between the first heat exchanger 11 and the decompression mechanism 12, and a subcooling heat exchanger 17. The subcooling heat exchanger 17 is configured to exchange heat between the refrigerant decompressed in the decompression mechanism 18 and the refrigerant flowing between the first heat exchanger 11 and the decompression mechanism 12.

The reheating circuit 23 is a circuit configured to heat the air cooled in the second heat exchanger 13 when the second heat exchanger 13 functions as the evaporator. The reheating circuit 23 includes a third heat exchanger 21 and a refrigerant pipe. The third heat exchanger 21 is arranged in an air passage of air that has passed through the second heat exchanger 13 functioning as the evaporator. The refrigerant pipe causes the refrigerant, which has flowed out of the first heat exchanger 11 to flow toward the decompression mechanism 12, to flow through the third heat exchanger 21. A first solenoid valve 19 is provided in a refrigerant pipe connecting the first heat exchanger 11 and the decompression mechanism 12 to each other, whereas a second solenoid valve 20 is provided in a refrigerant pipe of the reheating circuit 23. When the first solenoid valve 19 is open and the second solenoid valve 20 is closed, the refrigerant does not flow into the reheating circuit 23. When the first solenoid valve 19 is closed and the second solenoid valve 20 is open, the refrigerant flows into the third heat exchanger 21 of the reheating circuit 23. In the third heat exchanger 21 of the reheating circuit 23, the air flowing out of the second heat exchanger 13 functioning as the evaporator and the refrigerant before flowing into the decompression mechanism 12 exchange heat to heat the air.

The subcooling circuit 22 and the reheating circuit 23 of the first heat source device 1 are circuits to be used for a cooling operation and are not used for a heating operation. When the present invention is applied to an air-conditioning apparatus that does not perform the cooling operation, the subcooling circuit 22 and the reheating circuit 23 are not required to be provided.

The refrigerant caused to circulate through the refrigerant circuit of the first heat source device 1 is not particularly limited. For example, a hydrofluorocarbon (HFC) refrigerant such as R410A and R32, a hydrochlorofluorocarbon (HCFC) refrigerant, or a natural refrigerant such as hydrocarbon or carbon dioxide is used.

<Configurations of Sensors>

The air-conditioning apparatus 100 includes a plurality of sensors as devices configured to acquire information relating to an operating state. As illustrated in FIG. 1, temperature sensors 50, 51, 52, and 53 are provided as sensors configured to detect a temperature of the air flowing through the supply air passage 5. The temperature sensor 50 detects a temperature of the SA supplied to the indoor space from the air-conditioning apparatus 100, specifically, a temperature of the air after being air-conditioned in the first heat source device 1 or the second heat source device 2. In Embodiment 1, the temperature sensor 50 is installed at an outlet port of the use-side casing 3 for the SA, and detects the temperature of air passing through the outlet port. The temperature of the air detected by the temperature sensor 50 is referred to as "outlet temperature". The temperature sensor 51 detects a temperature of the process air to be air-conditioned in the first heat source device 1 or the second heat source device 2. The temperature sensor 51 of Embodiment 1 detects an air temperature on a downstream side of the total heat exchanger 32 and on an upstream side of the second heat exchanger 13. The temperature sensor 52 detects an air temperature on a downstream side of the second heat exchanger 13 and on an upstream side of the third heat exchanger 21. The temperature sensor 53 detects an air temperature on a downstream side of the third heat exchanger 21 and on an upstream side of the temperature sensor 50.

As illustrated in FIG. 2, temperature sensors 40, 41, 42, 43, 44, 45, and 46 are provided as sensors configured to detect a temperature of the refrigerant flowing through the refrigerant circuit of the first heat source device 1. The temperature sensor 40 is provided to the refrigerant pipe through which high-pressure refrigerant discharged from the compressor 10 flows. The temperature sensor 41 is provided to the refrigerant pipe connecting the first heat exchanger 11 and the decompression mechanism 12 to each other. The temperature sensor 42 is provided to the refrigerant pipe connecting the decompression mechanism 12 and the second heat exchanger 13 to each other. The temperature sensor 43 is provided to the refrigerant pipe connecting the second heat exchanger 13 and the four-way valve 15 to each other. The temperature sensor 44 is provided to the refrigerant pipe connecting the decompression mechanism 12 and the decompression mechanism 18 of the subcooling circuit 22 to each other. The temperature sensor 45 is provided to the refrigerant pipe of the subcooling circuit 22, which is located between the decompression mechanism 18 and the subcooling heat exchanger 17. The temperature sensor 46 is provided to the refrigerant pipe of the subcooling circuit 22, which is located between the subcooling heat exchanger 17 and the accumulator 16. The temperature sensors 40, 41, 42, 43, 44, 45, and 46 detect refrigerant temperatures at respective locations of installation.

The first heat source device 1 includes a temperature sensor 47 as a sensor configured to detect a temperature of air exchanging heat with the refrigerant flowing through the first heat exchanger 11. The temperature sensor 47 of Embodiment 1 is installed on an upstream side of the fan 14 configured to send air to the first heat exchanger 11 and detects an air temperature at a location where the temperature sensor 47 is installed.

The first heat source device 1 includes pressure sensors 60 and 61 as sensors each being configured to detect a pressure of the refrigerant flowing through the refrigerant circuit. The pressure sensor 60 is provided to the refrigerant pipe through which high-pressure refrigerant discharged from the compressor 10 flows. The pressure sensor 61 is provided to the refrigerant pipe through which low-pressure refrigerant flows, on an inlet side of the accumulator 16. The pressure sensors 60 and 61 detect the pressures of the refrigerant at respective locations of installation.

It is preferred that a power meter 33 be installed for the heat source-side casing 4. The power meter 33 is configured to detect an electric power consumption of the first heat source device 1.

<Functional Configuration>

Figure 3:
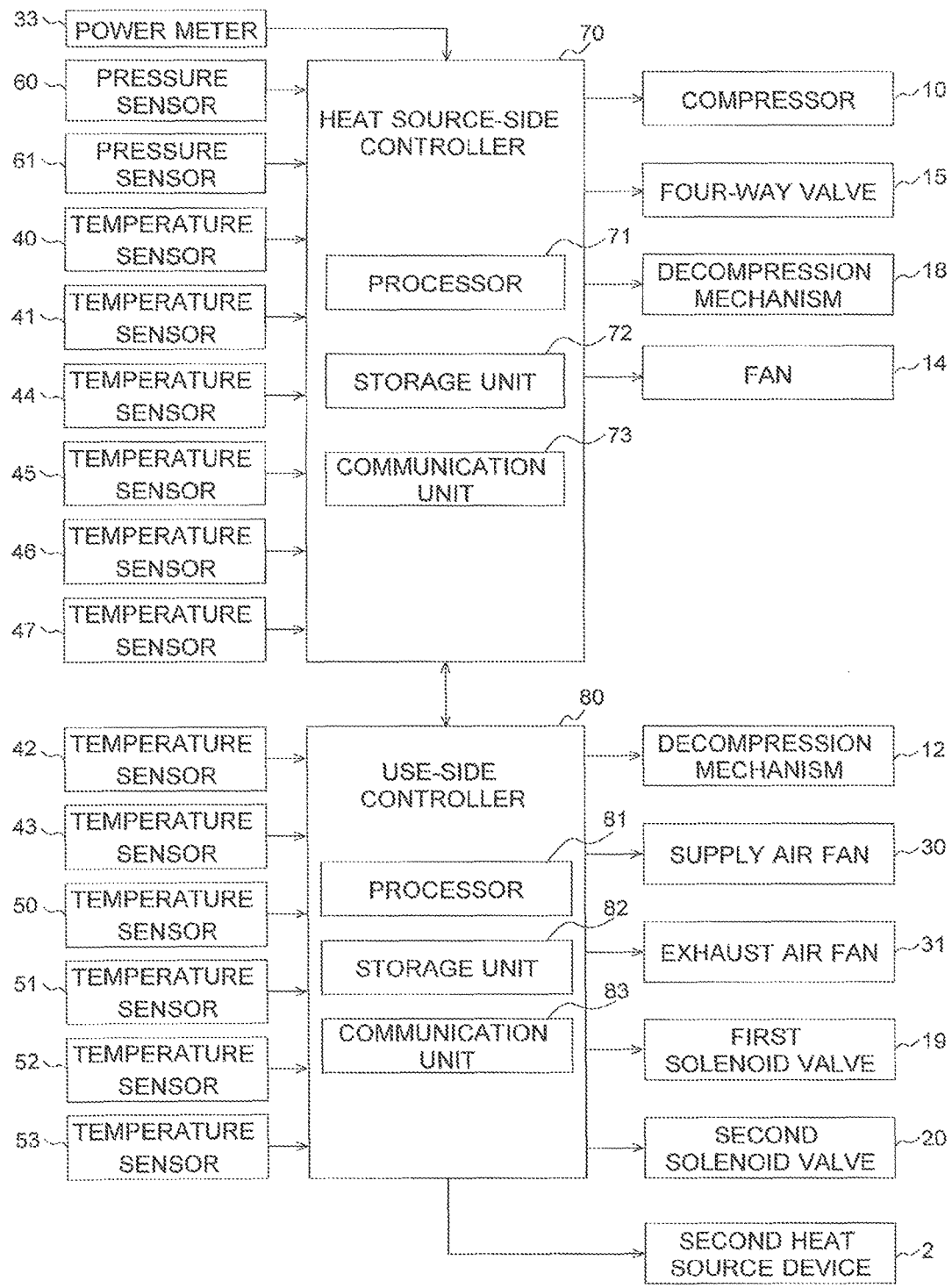
FIG. 3 is a functional block diagram of the air-conditioning apparatus according to Embodiment 1.

FIG. 3 is a functional block diagram of the air-conditioning apparatus 100 according to Embodiment 1. The air-conditioning apparatus 100 according to Embodiment 1 includes a heat source-side controller 70 and a use-side controller 80. The heat source-side controller 70 and the use-side controller 80 cooperate to control the air-conditioning apparatus 100. As illustrated in FIG. 1 and FIG. 2, the heat source-side controller 70 is accommodated in the heat source-side casing 4, whereas the use-side controller 80 is accommodated in the use-side casing 3. The heat source-side controller 70 and the use-side controller 80 are connected through communication, and transmit and receive information therebetween.

The heat source-side controller 70 includes a processor 71, a storage unit 72, and a communication unit 73. Various types of control of the heat source-side controller 70 are achieved by software, firmware, or a combination of software and firmware. The software and the firmware are described as programs and stored in the storage unit 72. The processor 71 reads the program stored in the storage unit 72 and executes the read program to achieve functions of the heat source-side controller 70. The storage unit 72 stores various set values, target values, threshold values, and other values that are used for control. The storage unit 72 is, for example, a non-volatile or volatile semiconductor memory such as a RAM, a ROM, a flash memory, an EPROM, or an EEPROM. The communication unit 73 is a communication circuit configured to transmit and receive a control signal to/from the use-side controller 80 through wired communication or wireless communication.

Output from the sensors accommodated in the heat source-side casing 4, specifically, output from the pressure sensors 60 and 61 and the temperature sensors 40, 41, 44, 45, 46, and 47 and output from the power meter 33 are input to the heat source-side controller 70. The heat source-side controller 70 determines details of control and control parameters based on the input from the above-mentioned sensors and the power meter 33 and the information stored in the storage unit 72 to control actuators such as the compressor 10, the four-way valve 15, the decompression mechanism 18, and the fan 14. Further, the heat source-side controller 70 outputs a control signal or detection values of the sensors to the use-side controller 80.

The use-side controller 80 includes a processor 81, a storage unit 82, and a communication unit 83. Various types of control of the use-side controller 80 are achieved by software, firmware, or a combination of software and firmware. The software and the firmware are described as programs and stored in the storage unit 82. The processor 81 reads the program stored in the storage unit 82 and executes the read program to achieve functions of the use-side controller 80. The storage unit 82 stores various set values, target values, threshold values, and other values that are used for control. The storage unit 82 is, for example, a non-volatile or volatile semiconductor memory such as a RAM, a ROM, a flash memory, an EPROM, or an EEPROM. The communication unit 83 is a communication circuit configured to transmit and receive a control signal to/from the heat source-side controller 70 through wired communication or wireless communication.

Output from the sensors accommodated in the use-side casing 3, specifically, output from the temperature sensors 42, 43, 50, 51, 52, and 53 is input to the use-side controller 80. The use-side controller 80 controls the second heat source device 2 and actuators such as the decompression mechanism 12, the supply air fan 30, the exhaust air fan 31, the first solenoid valve 19, and the second solenoid valve 20 based on the input from the above-mentioned sensors and the information stored in the storage unit 82. Further, the use-side controller 80 outputs a control signal or detection values of the sensors to the heat source-side controller 70.

Although there is described in Embodiment 1 an example in which each of the heat source-side controller 70 and the use-side controller 80 is constructed of a processor configured to execute the program stored in the storage unit, each of the heat source-side controller 70 and the use-side controller 80 may be constructed of dedicated hardware. When each of the heat source-side controller 70 and the use-side controller 80 is the dedicated hardware, for example, a single circuit, a combined circuit, an application specific integrated circuit (ASIC), a field-programmable gate array (FPGA), or a combination thereof corresponds to each of the heat source-side controller 70 and the use-side controller 80. Functional units to be achieved by the heat source-side controller 70 and the use-side controller 80 may be achieved by individual pieces of hardware, or each functional unit may be achieved by a single piece of hardware.

The functions of the heat source-side controller 70 and the use-side controller 80 are conceptually illustrated in FIG. 3, and therefore the heat source-side controller 70 and the use-side controller 80 are not necessarily required to be configured physically as illustrated in FIG. 3. Specifically, specific modes of distribution and integration of elements capable of achieving the functions are not limited to those illustrated in FIG. 3, and an entity or a part thereof can be configured in a functionally or physically distributed or integrated manner in a desired unit in accordance with a load or a condition of use. For example, one or more of the actuators controlled by the use-side controller 80 in FIG. 3 may be controlled by the heat source-side controller 70. The functions of the heat source-side controller 70 and the use-side controller 80 may be achieved by a single controller.

<Operation Modes of Air-Conditioning Apparatus 100>

The air-conditioning apparatus 100 operates in the cooling operation and the heating operation as operation modes. The heating operation includes a first heating operation using a heat generated by the heat pump of the first heat source device 1 as a heat source and a second heating operation using the second heat source device 2 as a heat source. The air-conditioning apparatus 100 also operates in a defrosting operation for melting frost adhering to the first heat exchanger 11 during the first heating operation.

(1) Cooling Operation

The cooling operation is an operation of cooling the OA being the process air with the first heat source device 1 and supplying the cooled process air to the indoor space as the SA.

First, with reference to FIG. 2, an operation of the refrigeration cycle of the first heat source device 1 is described. In the cooling operation, the four-way valve 15 connects a discharge side of the compressor 10 to the first heat exchanger 11 and connects a suction side of the compressor 10 to the second heat exchanger 13. The decompression mechanism 18 of the subcooling circuit 22 is opened at a predetermined opening degree. The first solenoid valve 19 is open, whereas the second solenoid valve 20 is closed. High-temperature and high-pressure gas refrigerant discharged from the compressor 10 flows into the first heat exchanger 11 and exchanges heat with the air supplied from the fan 14 to have a decreased temperature. The refrigerant flowing out of the first heat exchanger 11 exchanges heat with the refrigerant, which has been decompressed in the decompression mechanism 18, in the subcooling heat exchanger 17 to have an increased degree of subcooling. The refrigerant having the increased degree of subcooling passes through the first solenoid valve 19, is decompressed in the decompression mechanism 12, and flows into the second heat exchanger 13. The refrigerant flowing into the second heat exchanger 13 exchanges heat with air around the second heat exchanger 13 to have a decreased temperature. Low-pressure gas refrigerant flowing out of the second heat exchanger 13 passes through the four-way valve 15 and the accumulator 16 and is sucked into the compressor 10.

Next, with reference to FIG. 1, a flow of the air in the cooling operation is described. When the supply air fan 30 and the exhaust air fan 31 are activated, the OA being the process air flows through the supply air passage 5 of the use-side casing 3 to flow into the total heat exchanger 32, while the RA flows through the exhaust air passage 6 to flow into the total heat exchanger 32. In the total heat exchanger 32, the RA and the process air exchange heat. The process air, which has passed through the total heat exchanger 32, passes through the second heat exchanger 13. When passing through the second heat exchanger 13, the process air exchanges heat with the refrigerant flowing through the second heat exchanger 13 to have a decreased temperature and is then supplied as the SA to the indoor space. When the second solenoid valve 20 is closed in this case, the refrigerant does not flow through the third heat exchanger 21. Thus, the third heat exchanger 21 does not function as a heat exchanger. Further, the second heat source device 2 is deactivated and therefore does not function as the heat source. Meanwhile, the RA, which has exchanged the heat with the process air in the total heat exchanger 32, is discharged as the EA to the outdoor space.

When the reheating circuit 23 is used in the cooling operation, the first solenoid valve 19 is closed and the second solenoid valve 20 is opened to cause the refrigerant to flow through the third heat exchanger 21 of the reheating circuit 23. In this manner, the air that has passed through the second heat exchanger 13 exchanges heat with the refrigerant passing through the third heat exchanger 21, which has a temperature higher than a temperature of the refrigerant flowing through the second heat exchanger 13, to have an increased temperature. In this manner, condensation occurring in the supply air passage 5 can be suppressed.

(2) First Heating Operation

The first heating operation is an operation of heating the OA being the process air with the first heat source device 1 and supplying the heated process air to the indoor space as the SA. In the first heating operation, the second heat source device 2 is not activated.

First, with reference to FIG. 2, an operation of the refrigeration cycle of the first heat source device 1 is described. In the first heating operation, the four-way valve 15 connects the discharge side of the compressor 10 to the second heat exchanger 13 and connects the suction side of the compressor 10 to the first heat exchanger 11. The decompression mechanism 18 of the subcooling circuit 22 is fully closed. The first solenoid valve 19 is open, whereas the second solenoid valve 20 is closed. High-temperature and high-pressure gas refrigerant discharged from the compressor 10 flows into the second heat exchanger 13 and exchanges heat with the air around the second heat exchanger 13 to have a decreased temperature. The refrigerant flowing out of the second heat exchanger 13 is decompressed in the decompression mechanism 12 and then flows into the first heat exchanger 11. The refrigerant flowing into the first heat exchanger 11 exchanges heat with the air supplied from the fan 14 to turn into low-pressure gas refrigerant. Low-pressure gas refrigerant flowing out of the first heat exchanger 11 passes through the four-way valve 15 and the accumulator 16 and is sucked into the compressor 10.

Next, with reference to FIG. 1, a flow of the air in the first heating operation is described. When the supply air fan 30 and the exhaust air fan 31 are activated, the OA being the process air flows through the supply air passage 5 of the use-side casing 3 to flow into the total heat exchanger 32, while the RA flows through the exhaust air passage 6 to flow into the total heat exchanger 32. In the total heat exchanger 32, the RA and the process air exchange heat. The process air, which has passed through the total heat exchanger 32, passes through the second heat exchanger 13. When passing through the second heat exchanger 13, the process air exchanges heat with the refrigerant flowing through the second heat exchanger 13 to have an increased temperature and is then supplied as the SA to the indoor space. In this case, the deactivated second heat device 2 does not function as the heat source. Meanwhile, the RA, which has exchanged the heat with the process air in the total heat exchanger 32, is discharged as the EA to the outdoor space.

Control of the actuators in the first heating operation is described. A target value related to the air supplied as the SA in the first heating operation is preset in the storage unit 72 or the storage unit 82. An operating frequency of the compressor 10 is controlled so that the outlet temperature detected by the temperature sensor 50 becomes closer to a target value stored in the storage unit 72 or the storage unit 82. A predetermined margin may be provided to the target value. The rotation speed of the fan 14 is controlled so that an evaporating temperature of the refrigerant becomes closer to a target evaporating temperature stored in the storage unit 72 or the storage unit 82. A value of a saturation temperature corresponding to a detection value of the pressure sensor 61 that detects a pressure of the refrigerant on the suction side of the compressor 10 can be used as the evaporating temperature. The decompression mechanism 12 is controlled so that a degree of subcooling of the refrigerant passing through the second heat exchanger 13 becomes closer to a target value stored in the storage unit 72 or the storage unit 82. In this case, the degree of subcooling of the refrigerant flowing through the second heat exchanger 13 is obtained by subtracting the detection value of the temperature sensor 42 from the saturation temperature corresponding to the detection value of the pressure sensor 60 that detects the pressure of the refrigerant on the discharge side of the compressor 10.

(3) Second Heating Operation

The second heating operation is an operation of heating the OA being the process air with the second heat source device 2 and supplying the heated process air to the indoor space as the SA. In the second heating operation, the first heat source device 1 is not activated.

With reference to FIG. 1, a flow of the air in the second heating operation is described. When the supply air fan 30 and the exhaust air fan 31 are activated, the OA being the process air flows through the supply air passage 5 of the use-side casing 3 to flow into the total heat exchanger 32, while the RA flows through the exhaust air passage 6 to flow into the total heat exchanger 32. In the total heat exchanger 32, the RA and the process air exchange heat. The process air, which has passed through the total heat exchanger 32, passes through the second heat exchanger 13 and the third heat exchanger 21, which do not function as the heat exchangers, and then flows into the second heat source device 2. The process air flowing into the second heat source device 2 is heated by the second heat source device 2 to have an increased temperature and is then supplied as the SA to the indoor space. Meanwhile, the RA, which has exchanged the heat with the process air in the total heat exchanger 32, is discharged as the EA to the outdoor space.

A target value related to the air supplied as the SA in the second heating operation is preset in the storage unit 82. A heating amount of the second heat source device 2 is controlled so that the outlet temperature detected by the temperature sensor 50 becomes closer to the target value stored in the storage unit 82. When the second heat source device 2 is a gas furnace, the heating amount of the second heat source device 2 is adjusted by the amount of supplied fuel (gas).

(4) Defrosting Operation

The air-conditioning apparatus 100 according to Embodiment 1 further performs the defrosting operation. In the defrosting operation, the frost adhering to the first heat exchanger 11 functioning as the evaporator during the first heating operation is melted. Further, in the defrosting operation of Embodiment 1, the process air is heated by the second heat source device 2, and the heated process air is supplied as the SA to the indoor space. In the defrosting operation, the four-way valve 15 of the first heat source device 1 connects the discharge side of the compressor 10 to the first heat exchanger 11 and connects the suction side of the compressor 10 to the second heat exchanger 13. The decompression mechanism 18 of the subcooling circuit 22 is fully closed. The first solenoid valve 19 is open, whereas the second solenoid valve 20 is closed. The second heat source device 2 performs the heating operation. The supply air fan 30 and the exhaust air fan 31 are activated to ventilate the indoor space. The fan 14 is deactivated.

With reference to FIG. 2, an operation of the refrigeration cycle of the first heat source device 1 in the defrosting operation is described. The high-temperature and high-pressure gas refrigerant discharged from the compressor 10 passes through the four-way valve 15 and flows into the first heat exchanger 11 to melt the frost adhering to the first heat exchanger 11 to turn into high-pressure liquid refrigerant. The refrigerant flowing out of the first heat exchanger 11 is decompressed in the decompression mechanism 12 and flows into the second heat exchanger 13 to be evaporated. The refrigerant flowing out of the second heat exchanger 13 passes through the four-way valve 15 and the accumulator 16 and is sucked into the compressor 10.

Next, with reference to FIG. 1, a flow of the air in the defrosting operation is described. When the supply air fan 30 and the exhaust air fan 31 are activated, the OA being the process air flows through the supply air passage 5 of the use-side casing 3 to flow into the total heat exchanger 32, while the RA flows through the exhaust air passage 6 to flow into the total heat exchanger 32. In the total heat exchanger 32, the RA and the process air exchange heat. The process air, which has passed through the total heat exchanger 32, passes through the second heat exchanger 13 and then flows into the second heat source device 2. The process air flowing into the second heat source device 2 is heated by the second heat source device 2 to have an increased temperature and is then supplied as the SA to the indoor space. Meanwhile, the RA, which has exchanged the heat with the process air in the total heat exchanger 32, is discharged as the EA to the outdoor space.

As described above, in the defrosting operation, the frost adhering to the first heat exchanger 11 during the first heating operation is melted, while the process air is heated by the second heat source device 2 to enable heating the indoor space. The heating amount of the second heat source device 2 is controlled so that the outlet temperature, which is detected by the temperature sensor 50, becomes closer to a target value stored in the storage unit 82.

In the defrosting operation, the operating frequency of the compressor 10 is fixed to a value higher than that used in the cooling operation so as to obtain high-temperature refrigerant, which is required to melt the frost adhering to the first heat exchanger 11. Further, in order to increase a flow rate of the refrigerant to shorten time of the defrosting operation, an opening degree of the decompression mechanism 12 is fixed to a maximum opening degree.

<Operation Switching>

The air-conditioning apparatus 100 performs the first heating operation and the second heating operation as described above. For the heating operation, any one of the first heating operation and the second heating operation is selectively carried out. Control for operation switching between the first heating operation and the second heating operation is described below.

(1) Switching from First Heating Operation to Second Heating Operation

Figure 4:
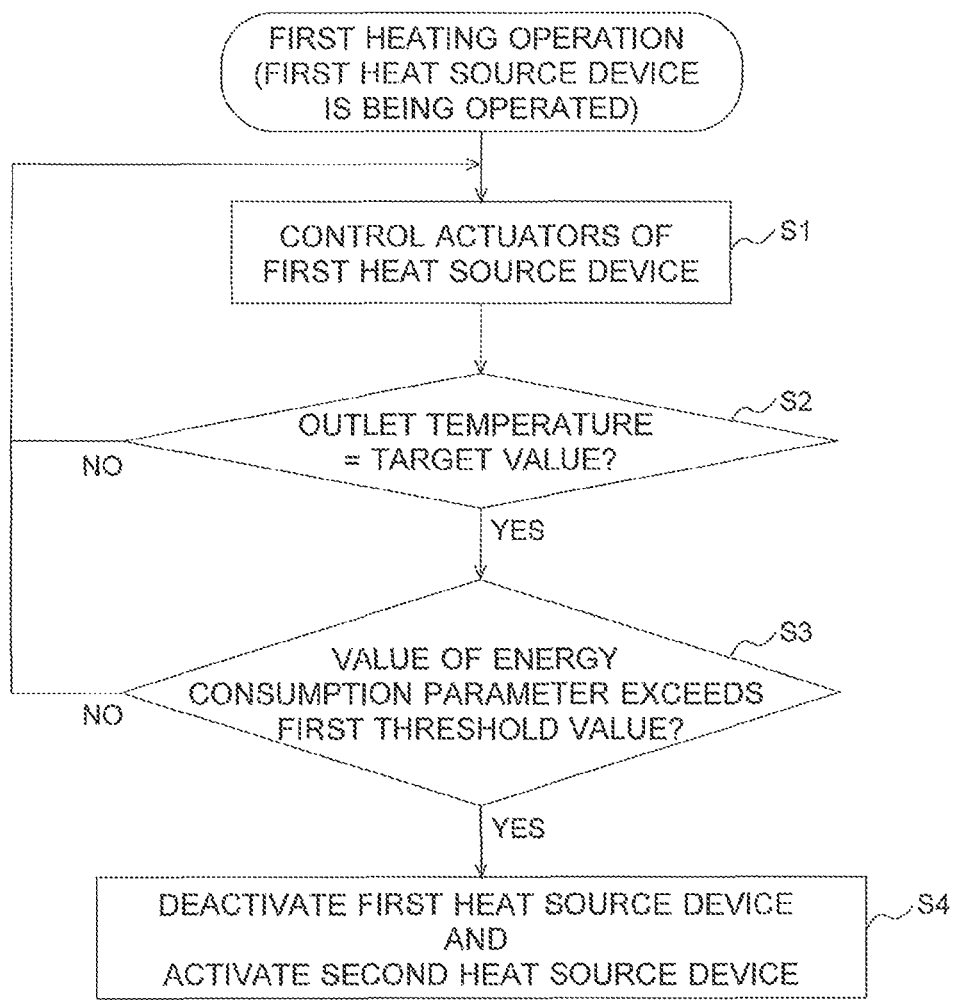
FIG. 4 is a flowchart for illustrating switching control from a first heating operation to a second heating operation in the air-conditioning apparatus according to Embodiment 1.

FIG. 4 is a flowchart for illustrating switching control from the first heating operation to the second heating operation in the air-conditioning apparatus 100 according to Embodiment 1 of the present invention. During a period in which the first heating operation for heating the process air by the first heat source device 1 is being performed, the actuators of the first heat source device 1 are controlled (Step S1). The outlet temperature and the target value are compared to each other (Step S2). When the outlet temperature is not equal to the target value (NO in Step S2), the actuators of the first heat source device 1 are further controlled so that the outlet temperature becomes closer to the target value (Step S1). When the outlet temperature and the target value are equal to each other (YES in Step S2), the processing proceeds to the next step. In Embodiment 1, the outlet temperature is detected by the temperature sensor 50. The target value is stored in advance in the storage unit 72 or the storage unit 82. Through the processing in Step S1 and Step S2, the outlet temperature is kept at the target value.

In Step S3, a value of an energy consumption parameter and a first threshold value are compared to each other. When the energy consumption parameter does not exceed the first threshold value (NO in Step S3), the processing returns to Step S1 to continue the first heating operation. Meanwhile, when the energy consumption parameter exceeds the first threshold value (YES in Step S3), the first heat source device 1 is deactivated and the second heat source device 2 is activated (Step S4).

The energy consumption parameter is a measured value indicating the energy consumption used to drive the first heat source device 1 or a factor that determines the energy consumption. The first heat source device 1 of Embodiment 1 is operated by using electricity as energy. Thus, the energy consumption parameter can also be referred to as the measured value indicating the electric power consumption or the factor that determines the electric power consumption. A specific example of the energy consumption parameter in Embodiment 1 is the rotation speed of the fan 14, the evaporating temperature, the electric power consumption of the first heat source device 1, and the temperature of the air supplied to the evaporator.

In Step S3, at least one of the rotation speed of the fan 14, the evaporating temperature, the electric power consumption of the first heat source device 1, and the temperature of the air supplied to the evaporator is compared to the first threshold value corresponding thereto. In Step S3, the first threshold value to be compared to the energy consumption parameter is preset for each parameter and stored in the storage unit 72 or the storage unit 82. A running cost of the first heating operation and a running cost of the second heating operation are compared to each other, and a value at a point at which the running costs become equal to each other is used as the first threshold value. Specific examples are described below.

Figure 5:
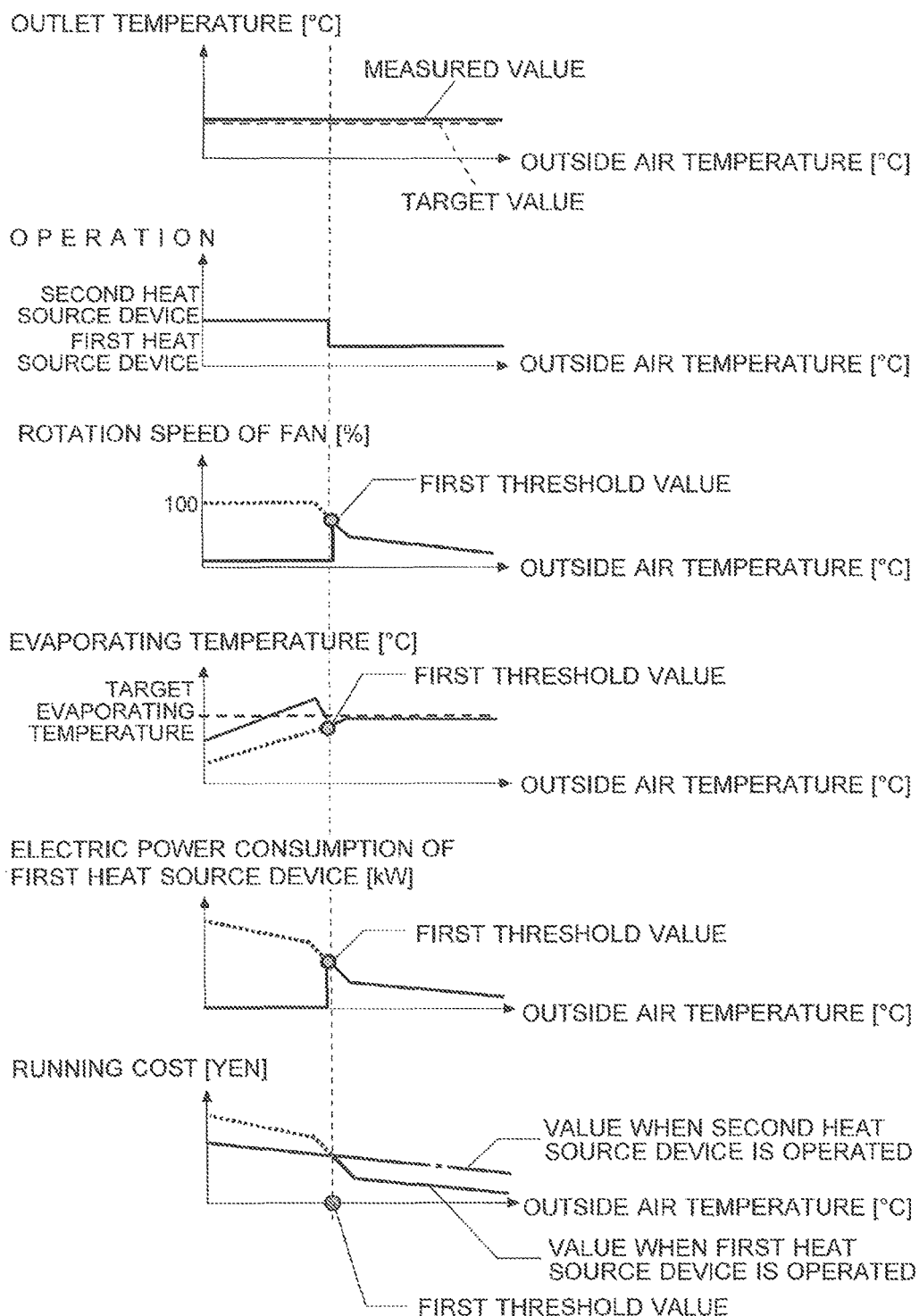
FIG. 5 is graphs for showing operating states of the first heat source device and a second heat source device and energy consumption parameters in Embodiment 1.

FIG. 5 is graphs for showing operating states of the first heat source device 1 and the second heat source device 2 and energy consumption parameters in Embodiment 1. On the horizontal axis of each of the graphs of FIG. 5, the outside air temperature, specifically, the temperature of air supplied to the first heat exchanger 11 functioning as the evaporator is indicated. On the vertical axes of the graphs of FIG. 5, the outlet temperature, switching between the first heat source device 1 and the second heat source device 2, the rotation speed of the fan 14, the evaporating temperature, the electric power consumption of the first heat source device 1, and the running cost are indicated in the stated order from the top. As shown in FIG. 5, the operation of the first heat source device 1 and the operation of the second heat source device 2 are switched under a state in which the outlet temperature is kept at the target value.

First, the running cost is described. The graph for the running cost in FIG. 5 indicates a cost obtained by converting the energy consumption of the first heat source device 1 and the energy consumption of the second heat source device 2. In Embodiment 1, the first heat source device 1 is operated using the electricity as the energy. The second heat source device 2 is operated using a gas as the energy when being the gas furnace, and is operated using kerosene as the energy when being the kerosene burner. A unit energy cost being a cost per unit calorific value is stored in the storage unit 72 or the storage unit 82 to calculate the running cost. The unit energy cost is multiplied by an energy usage to obtain the running cost. In Embodiment 1, an electricity rate (yen/kWh) is stored as the unit energy cost of the first heat source device 1, whereas an electricity rate equivalent (yen/kWh) of a fuel rate is stored as the unit energy cost of the second heat source device 2. When the energy used to operate the second heat source device 2 is a gas, the electricity rate equivalent (yen/kWh) of the fuel rate can be calculated by using a gas rate (yen/m$^3$), a gas calorific value (MJ/m$^3$), and a primary energy conversion formula for electricity (MJ/kWh). Although the electricity rate is used as the unit energy cost as an example in Embodiment 1, other indices may be used as long as the first heat source device 1 and the second heat source device 2, which use different kinds of energy, are compared by using the same index.

The unit energy cost of the first heat source device 1 and the unit energy cost of the second heat source device 2 are stored in the storage unit 72 or the storage unit 82 when the air-conditioning apparatus 100 is shipped from a factory or when the air-conditioning apparatus 100 is installed. A value of the unit energy cost is generally determined for each country or unit of countries (for example, Japan, European countries, and North America). Even in the same country, a different value is sometimes determined depending on a region (for example, West Coast and East Coast of North America). Therefore, a value of the unit energy cost for each country or each region may be stored in the storage unit 72 or the storage unit 82 at the time of shipment from the factory. When the air-conditioning apparatus 100 is installed, the country or the region input by a constructor is stored in the storage unit 72 or the storage unit 82. For the operation, the unit energy cost of the input country or region is used. In this manner, erroneous input of a digit of the unit energy cost by the constructor that installs the air-conditioning apparatus 100 can be prevented.

The graph for the running cost in FIG. 5 shows the following. Specifically, as the outside air temperature decreases, the running cost of the first heat source device 1 increases. Further, the running cost of the first heat source device 1 does not linearly increase uniformly, and the running cost steeply increases in a certain temperature zone of the outside air temperature. Further, it is understood that the running cost of the second heat source device 2 increases linearly as the outside air temperature decreases. The running cost of the first heat source device 1 and the running cost of the second heat source device 2 switch with each other at a certain point in a magnitude relationship therebetween. The rotation speed of the fan 14, the evaporating temperature, the electric power consumption of the first heat source device 1, and the outside air temperature at a point at which the running cost of the first heat source device 1 and the running cost of the second heat source device 2 become equal to each other are set as the first threshold values in Step S3 of FIG. 4. Based on the first threshold values, the first heating operation is switched to the second heating operation.

Relationships of specific examples of the energy consumption parameters are described. The evaporating temperature of the refrigerant is used to determine the amount of operation in the control of the rotation speed of the fan 14. The rotation speed of the fan 14 is controlled so that the evaporating temperature becomes closer to the target evaporating temperature. Specifically, the rotation speed of the fan 14 is increased as the temperature of the air supplied to the first heat exchanger 11 functioning as the evaporator, which is the outside air temperature in Embodiment 1, decreases. The air-conditioning apparatus 100 has a control characteristic in which the rotation speed of the fan 14 steeply increases when the outside air temperature has a value close to the target evaporating temperature. Therefore, in the first heating operation, the rotation speed of the fan 14 increases along with the decrease in outside air temperature, and the electric power consumption of the first heat source device 1 increases along with the increase in the rotation speed of the fan 14. As described above, the evaporating temperature, the rotation speed of the fan 14, and the temperature of the air supplied to the evaporator serve as factors that determine the energy consumption of the first heat source device 1. Further, in the air-conditioning apparatus 100 having a ventilating function for heating the OA as the process air as in Embodiment 1, a heating load increases to increase the electric power consumption of the first heat source device 1 as the outside air temperature decreases. Even in this regard, the outside air temperature serves as a factor that determines the energy consumption of the first heat source device 1.

In a case where the evaporating temperature is used as the energy consumption parameter, when the evaporating temperature decreases to exceed the first threshold value, the first heating operation is switched to the second heating operation. In this manner, control having high versatility without depending on a heating capacity of the first heat source device 1 is enabled. Specifically, the heating capacity (horsepower) may differ depending on a device type of the first heat source device 1. The same control using the evaporating temperature as the energy consumption parameter can be applied to a plurality of the first heat source devices 1 having different heating capacities. Therefore, the control for the plurality of first heat source devices 1 having different heating capacities can be collectively developed and managed. The first threshold value used when the evaporating temperature is used as the energy consumption parameter can be set to, for example, the same value as the target evaporating temperature.

In a case where the rotation speed of the fan 14 is used as the energy consumption parameter, when the rotation speed of the fan 14 increases to exceed the first threshold value, the first heating operation is switched to the second heating operation. In this manner, unnecessary operation switching along with a temporary variation in refrigerant state hardly occurs. Specifically, for example, when the operating frequency of the compressor 10 or the amount of operation for the opening degree of the decompression mechanism 12 is changed, the refrigerant state, for example, the evaporating temperature, is temporarily varied in some cases. Although the rotation speed of the fan 14 is controlled based on the evaporating temperature, the rotation speed of the fan 14 is controlled so as to absorb the temporary variation in evaporating temperature. Therefore, the temporary variation in the refrigerant state hardly affects the rotation speed of the fan 14. Thus, by using the rotation speed of the fan 14 as the energy consumption parameter, the first heating operation can be prevented from being undesirably switched to the second heating operation when the running cost for the first heating operation is lower. The first threshold value used when the rotation speed of the fan 14 is used as the energy consumption parameter can be set to, for example, the maximum rotation speed of the fan 14 or a value smaller than the maximum rotation speed of the fan 14. In the latter case, the rotation speed at which a rate of the electric power consumption of the fan 14 to a total electric power consumption of the first heat source device 1 becomes large is determined as the first threshold value during development of the air-conditioning apparatus 100.

Both the evaporating temperature and the rotation speed of the fan 14 can be used as the energy consumption parameters. In this case, when the evaporating temperature decreases to exceed the first threshold value and the rotation speed of the fan 14 increases to exceed the first threshold value, the first heating operation is switched to the second heating operation. In this manner, the control with high versatility without depending on the heating capacity of the first heat source device 1 is enabled. At the same time, unnecessary operation switching along with the temporary variation in the refrigerant state can be made to hardly occur.

In a case where the electric power consumption of the first heat source device 1, which is measured by the power meter 33, is used as the energy consumption parameter, when the electric power consumption measured by the power meter 33 is larger than the first threshold value, the first heating operation is switched to the second heating operation. In this manner, the magnitude relationship between the running costs can be determined with high accuracy. Therefore, the first heating operation can be switched to the second heating operation at more appropriate timing at which the running cost can be reduced. The sum of the electric power consumptions of the devices provided in the use-side casing 3 and the heat source-side casing 4 can be used as the energy consumption parameter as described in Embodiment 1. Besides, the electric power consumptions of the devices provided in the heat source-side casing 4, which greatly affect the electric power consumption of the first heat source device 1, can be used as the energy consumption parameter. The first threshold value when the electric power consumption is used as the energy consumption parameter is set to a value at which the running cost computed from the electric power consumption of the first heat source device 1 becomes larger than the running cost of the second heat source device 2. A parameter used for the computation of the running cost is stored in advance in the storage unit 72 or the storage unit 82.

In a case where the outside air temperature is used as the energy consumption parameter, when the outside air temperature becomes lower than the first threshold value, the first heating operation is switched to the second heating operation. In this manner, unnecessary operation switching along with the temporary variation in operating state of the first heat source device 1 hardly occurs. Therefore, at more appropriate timing at which the running cost can be reduced, the first heating operation can be switched to the second heating operation. It has been described that the total heat exchanger 32 may be of a rotary type or a static type. In general, the rotary total heat exchanger has a higher heat exchange effectiveness than that of the static total heat exchanger. Therefore, when the rotary total heat exchanger is used as the total heat exchanger 32, a temperature of the process air in the supply air passage 5, which flows out of the total heat exchanger 32, is liable to be higher than that in a case where the static total heat exchanger is used. In view of the above, when the outside air temperature is used as the energy consumption parameter, different first threshold values may be used in Step S3 for a case where the rotary total heat exchanger 32 is used and for a case where the static total heat exchanger 32 is used.

A combination of any two or more of the rotation speed of the fan 14, the evaporating temperature, the electric power consumption of the first heat source device 1, and the outside air temperature may be used as the energy consumption parameter. Further, when the electric power consumption of the first heat source device 1 is not used as the energy consumption parameter, the power meter 33 is not required to be provided.

As illustrated in FIG. 4 and shown in FIG. 5, in Embodiment 1, the first heating operation is switched to the second heating operation based on the value of the energy consumption parameter under a state in which the outlet temperature is kept at the target value during the first heating operation. When the outlet temperature is kept at the target value, specifically, when a temperature of the process air heated by the first heat source device 1 is kept at the target temperature, it is considered that the first heat source device 1 is being operated under an operating state in which the operating capacity does not reach an upper limit and its COP is relatively large. With the control illustrated in FIG. 4 and shown in FIG. 5, the first heating operation is not switched to the second heating operation when the heating capacity of the heat pump reaches its upper limit as disclosed in Japanese Unexamined Patent Application Publication No. 2015-145759. Under a state in which the temperature of the heated process air is kept at the target temperature, the operation using the second heat source device 2 is started based on the parameter indicating the energy consumption of the first heat source device 1. Thus, when the operating state has a relatively small COP, the first heat source device 1 can be prevented from being activated. Therefore, an increase in primary energy consumption and an increase in running cost can be suppressed.

The first threshold value, which is compared to the energy consumption parameter in the determination of the operation switching, is determined so that the running cost required when the second heat source device 2 is operated becomes lower than the running cost required when the first heat source device 1 is operated. Therefore, the running cost for the heating operation can be reduced. Through reduction of the running cost, the primary energy consumption can be reduced. Therefore, an environment-friendly operation of the air-conditioning apparatus 100 can be achieved. The primary energy herein means energy derived from nature, such as a fossil fuel, an atomic-energy fuel, a water energy, or solar light. The electricity is energy generated by using an input heat amount of the fossil fuel or other energy source. The comparison between the running costs calculated using the unit energy cost described above can be regarded as being equivalent to the comparison of the primary energy costs. Therefore, even when different types of energy are directly used for the operation of the first heat source device 1 and the operation of the second heat source device 2, the running costs can be compared on the same basis.

(2) Switching from Second Heating Operation to First Heating Operation

Figure 6:
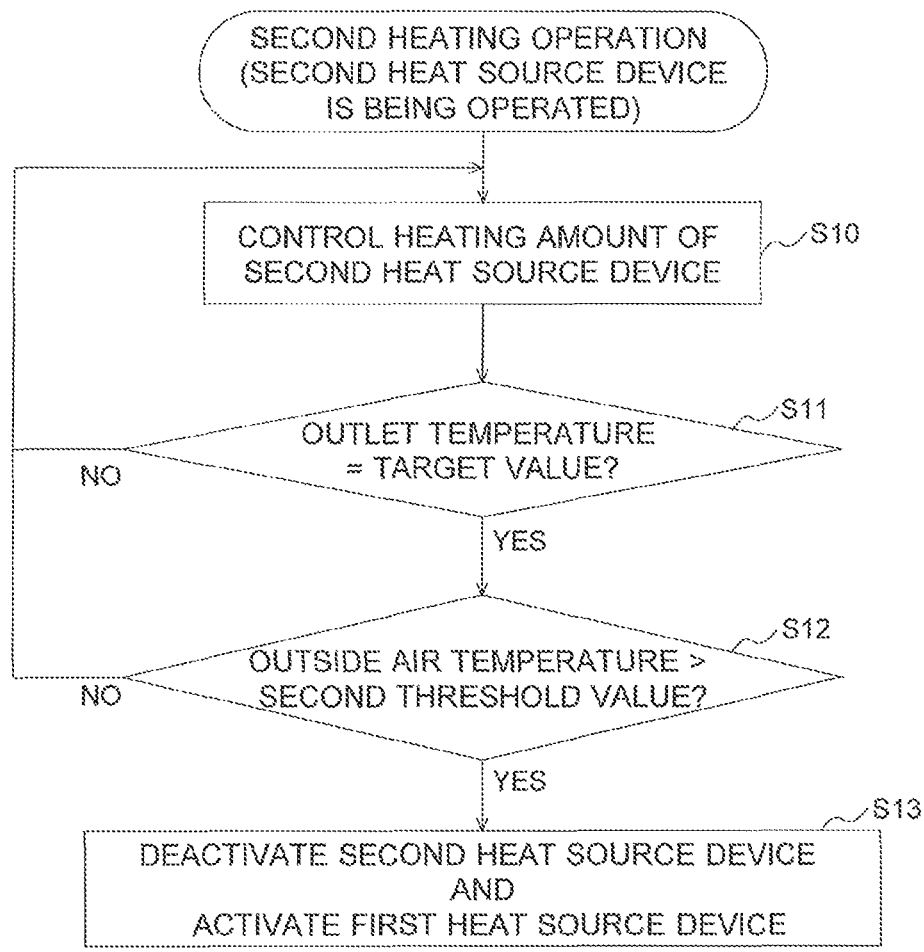
FIG. 6 is a flowchart for illustrating switching control from the second heating operation to the first heating operation in the air-conditioning apparatus according to Embodiment 1.

FIG. 6 is a flowchart for illustrating switching control from the second heating operation to the first heating operation in the air-conditioning apparatus 100 according to Embodiment 1. During a period in which the second heating operation for heating the process air by the second heat source device 2 is being performed, the heating amount of the second heat source device 2 is controlled (Step S10). The outlet temperature and the target value are compared to each other (Step S11). When the outlet temperature is not equal to the target value (NO in Step S11), the heating amount of the second heat source device 2 is further controlled so that the outlet temperature becomes closer to the target value (Step S10). When the outlet temperature and the target value are equal to each other (YES in Step S11), the processing proceeds to the next step. In Embodiment 1, the outlet temperature is detected by the temperature sensor 50. The target value is stored in advance in the storage unit 82. Through the processing in Step S10 and Step S11, the outlet temperature is kept at the target value.

In Step S12, the outside air temperature and a second threshold value are compared to each other. The outside air temperature is a temperature detected by the temperature sensor 47. The second threshold value is stored in advance in the storage unit 72 or the storage unit 82. When the outside air temperature is higher than the second threshold value (YES in Step S12), the second heat source device 2 is deactivated and the first heat source device 1 is activated (Step S13). When the outside air temperature is equal to or smaller than the second threshold value (NO in Step S12), the processing returns to Step S10 to continue the operation of the second heat source device 2.

The second threshold value to be compared to the outside air temperature in Step S12 can also be the target evaporating temperature that is the target value of the evaporating temperature in the first heat exchanger 11 of the first heat source device 1. In this case, when the outside air temperature becomes higher than the target evaporating temperature, the second heat source device 2 is deactivated and the first heat source device 1 is activated. In this manner, by using the outside air temperature and the target evaporating temperature, the second heating operation can be switched to the first heating operation at timing at which the running cost can be reduced.

The second threshold value to be compared to the outside air temperature in Step S12 can also be the value of the outside air temperature at the time of switching from the first heating operation to the second heating operation. In this case, the detection value of the temperature sensor 47 at the time when the first heat source device 1 is deactivated and the second heat source device 2 is activated in Step S4 of FIG. 4 is stored as the second threshold value in the storage unit 72 or the storage unit 82. Then, in Step S12 of FIG. 6, the second threshold value and the measured outside air temperature are compared to each other. When the measured outside air temperature becomes higher than the second threshold value, the second heat source device 2 is deactivated and the first heat source device 1 is activated. In this manner, by using the outside air temperature at the time when the second heat source device 2 is operated and the previous outside air temperature at the time of switching from the first heating operation to the second heating operation, the second heating operation can be switched to the first heating operation at timing at which the running cost can be reduced.

(3) Operation Switching for Operations Including Defrosting Operation

Figure 7:
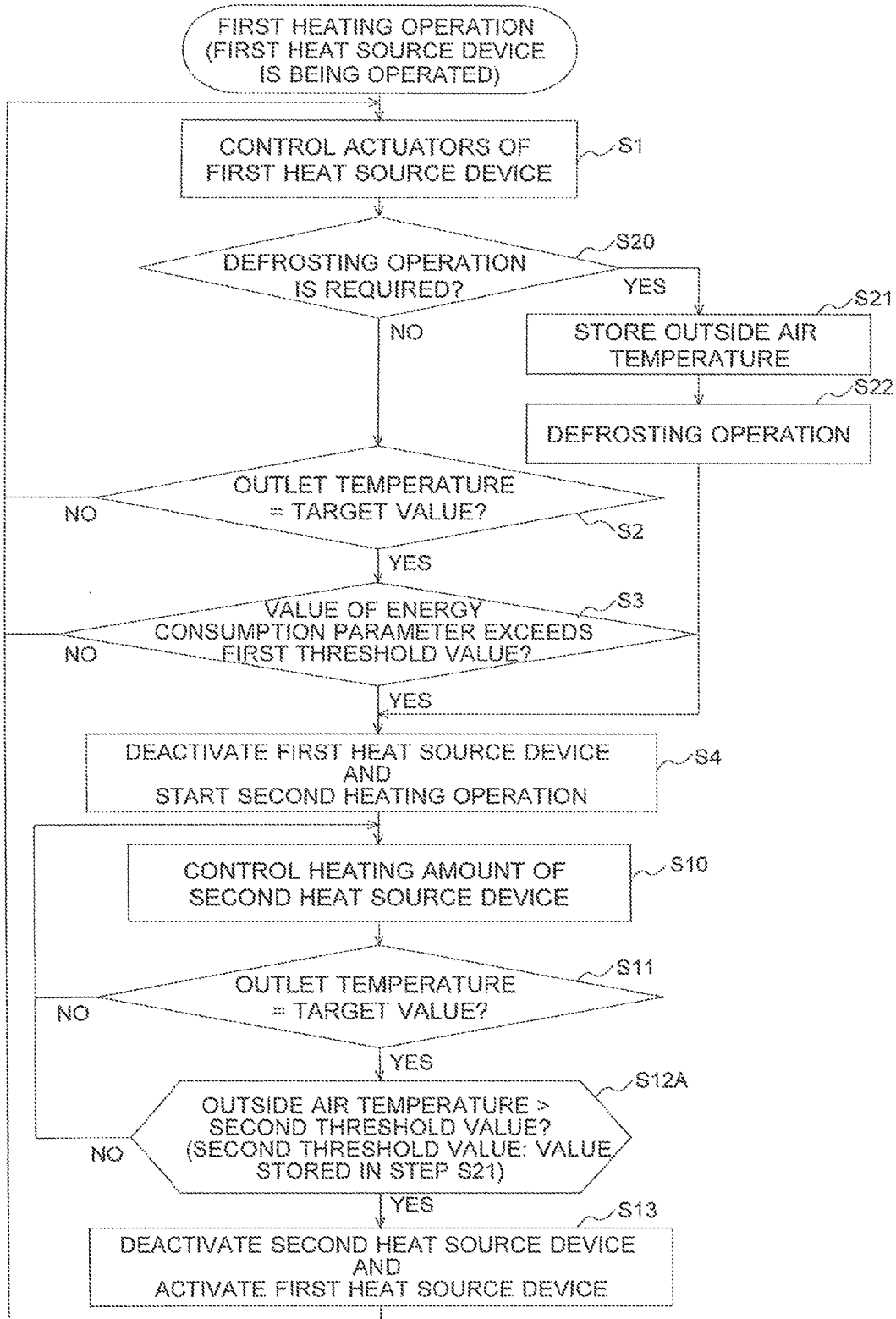
FIG. 7 is a flowchart for illustrating switching control between the first heating operation, a defrosting operation, and the second heating operation in the air-conditioning apparatus according to Embodiment 1.

FIG. 7 is a flowchart for illustrating switching control between the first heating operation, a defrosting operation, and the second heating operation in the air-conditioning apparatus 100 according to Embodiment 1. The operation switching for operations including the defrosting operation is described with reference to FIG. 7. Processing performed in Steps S1 to S4 of FIG. 7 is the same as the processing performed in Steps S1 to S4 of FIG. 4, and processing performed in Steps S10, S11, and S13 of FIG. 7 is the same as the processing performed in Steps S10, S11, and S13 of FIG. 6. Therefore, Steps S20 to S22 and Step S12A are mainly described below.

During a period in which the first heating operation for heating the process air is being performed by the first heat source device 1, the actuators of the first heat source device 1 are controlled (Step S1). Whether or not the defrosting operation is required is determined (Step S20). When the defrosting operation is required (YES in Step S20), the processing proceeds to Step S21. When the defrosting operation is not required (NO in Step S20), the processing proceeds to Step S2, and the heating operation is performed by the first heat source device 1 as described with reference to FIG. 4. Although information used for the determination of whether or not the defrosting operation is required is not particularly limited, the information is, for example, an ambient temperature of the first heat exchanger 11 and a surface temperature of the first heat exchanger 11. Whether or not the defrosting operation is required may be determined based on a combination of a plurality of pieces of information. The determination of whether or not the defrosting operation is required in Step S20 only needs to be executed during the period in which the first heating operation is being performed, and therefore timing of execution of Step S20 is not limited to that illustrated in FIG. 7.

When it is determined that the defrosting operation is required (YES in Step S20), the outside air temperature at this time is stored in the storage unit 72 or the storage unit 82 (Step S21). The outside air temperature is a temperature detected by the temperature sensor 47 in Embodiment 1. Subsequently, the defrosting operation is performed (Step S22).

After the defrosting operation is terminated, the processing proceeds to Step S4, and the first heat source device 1 is deactivated to start the second heating operation. Specifically, when the defrosting operation is performed after the first heating operation, the second heating operation is performed after the defrosting operation.

Although the processing performed in Step S10 and Step S11 for the second heating operation is the same as the processing that has been described with reference to FIG. 6, a condition for switching the second heating operation to the first heating operation, specifically, the processing performed in Step S12A is different from the processing performed in Step S12, which has been described with reference to FIG. 6. In Step S12A, the outside air temperature and the second threshold value are compared to each other. The second threshold value used in Step S12A is a value stored in Step S21. The outside air temperature is a temperature detected by the temperature sensor 47. When the outside air temperature is higher than the value stored in Step S21, specifically, the outside air temperature at the time of start of the defrosting operation (YES in Step S12A), the second heat source device 2 is deactivated and the first heat source device 1 is activated (Step S13). When the outside air temperature is equal to or smaller than the value stored in Step S21 (NO in Step S12A), the processing returns to Step S10 to continue the operation of the second heat source device 2.

Figure 8:
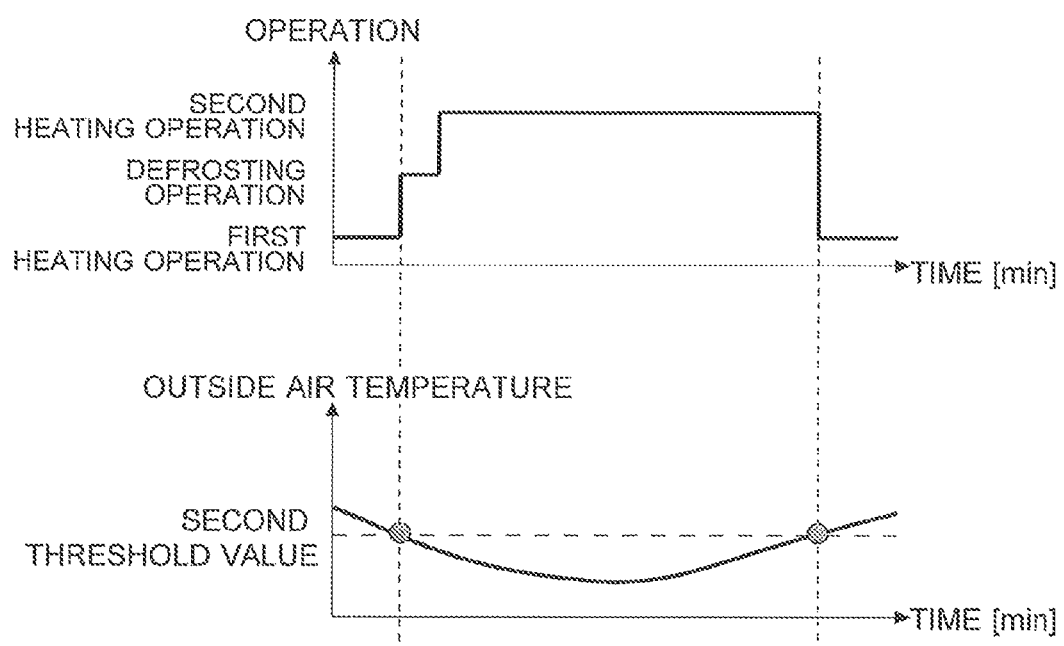
FIG. 8 is graphs for showing a relationship between switching between the first heating operation, the defrosting operation, and the second heating operation, and an outside air temperature in the air-conditioning apparatus according to Embodiment 1.

FIG. 8 is graphs for showing a relationship between switching between the first heating operation, the defrosting operation, and the second heating operation, and an outside air temperature in the air-conditioning apparatus 100 according to Embodiment 1. The graphs in FIG. 8 represent the operation described with reference to FIG. 7 along the time axis. As shown in FIG. 8, the defrosting operation is performed after the first heating operation, the second heating operation is performed after the defrosting operation, and the first heating operation is performed subsequently. The outside air temperature at the time of switching from the first heating operation to the defrosting operation and the outside air temperature at the time of switching from the second heating operation to the first heating operation are the same.

As described above, in the example illustrated in FIG. 7 and shown in FIG. 8, the operation subsequent to the defrosting operation is not the first heating operation but the second heating operation. The defrosting operation is required under a condition in which the frost is liable to adhere to the first heat exchanger 11, for example, when the outside air temperature being the ambient temperature of the first heat exchanger 11 functioning as the evaporator is lower than 0 degrees Celsius (for example, −2 degrees Celsius). Therefore, when the first heating operation is started after the defrosting operation under the condition in which the frost is still liable to adhere to the first heat exchanger 11, the defrosting operation will be required again. Further, in the defrosting operation, power is required for the first heat source device 1 to melt the frost adhering to the first heat exchanger 11. In addition, the second heat source device 2 is also operated in the defrosting operation. Thus, the energy consumption of the air-conditioning apparatus 100 is increased to increase the running cost. In Embodiment 1, instead of the first heating operation, the second heating operation is performed after the defrosting operation. As a result, the defrosting operation can be prevented from being performed, and hence the increase in running cost, which is caused along with the defrosting operation, can also be prevented.

In Embodiment 1, the condition for switching the second heating operation to the first heating operation after the start of the second heating operation subsequent to the defrosting operation is whether the outside air temperature is higher than the outside air temperature at the time of start of the defrosting operation. In this manner, the second heating operation is performed under a situation in which the outside air temperature is equal to or lower than the outside air temperature at the time of start of the defrosting operation, specifically, under the condition in which the frost is still liable to adhere to the first heat exchanger 11. Thus, the defrosting operation can be prevented from being performed.

Further, the outside air temperature stored in Step S21 of FIG. 7 may be used as the first threshold value used in Step S3. Specifically, when the outside air temperature is used as the energy consumption parameter in Step S3, the value of the outside air temperature stored in Step S21 is used as the first threshold value to be compared to the outside air temperature. In this manner, the defrosting operation during the period in which the first heating operation is being performed can be prevented from being performed.

Embodiment 2

While the air-conditioning apparatus 100 includes the total heat exchanger 32 in Embodiment 1, a configuration example of an air-conditioning apparatus 100A without a total heat exchanger is described in Embodiment 2 of the present invention. In Embodiment 2, differences from Embodiment 1 are mainly described.

Figure 9:
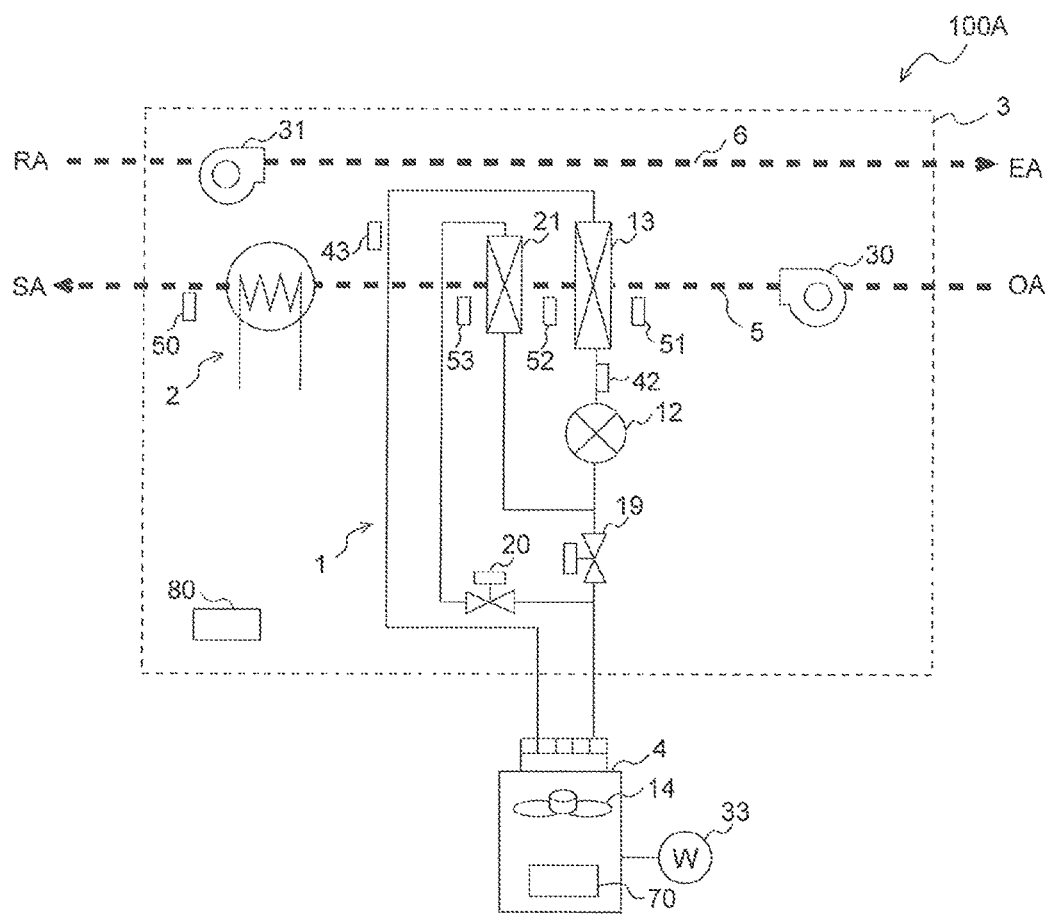
FIG. 9 is a schematic diagram of a system configuration of an air-conditioning apparatus according to Embodiment 2 of the present invention.

FIG. 9 is a schematic diagram of a system configuration of the air-conditioning apparatus 100A according to Embodiment 2. In contrast to the air-conditioning apparatus 100 according to Embodiment 1, the air-conditioning apparatus 100A does not include the total heat exchanger. Specifically, the OA taken from the outdoor space to flow through the supply air passage 5 and the RA taken from the indoor space to flow through the exhaust air passage 6 do not exchange heat. Therefore, the OA taken into the air-conditioning apparatus 100A is not heated by the RA as in Embodiment 1, and is heated by the first heat source device 1 or the second heat source device 2. Therefore, the heating amount required to heat the OA being the process air becomes larger in Embodiment 2 than in Embodiment 1. The operating frequency of the compressor 10 also becomes larger in Embodiment 2 than in Embodiment 1. Then, the effect on the total electric power consumption of the first heat source device 1, which is generated by the increase in operating frequency of the compressor 10, also increases. Therefore, in Embodiment 2, the energy consumption parameter includes the operating frequency of the compressor 10.

Figure 10:
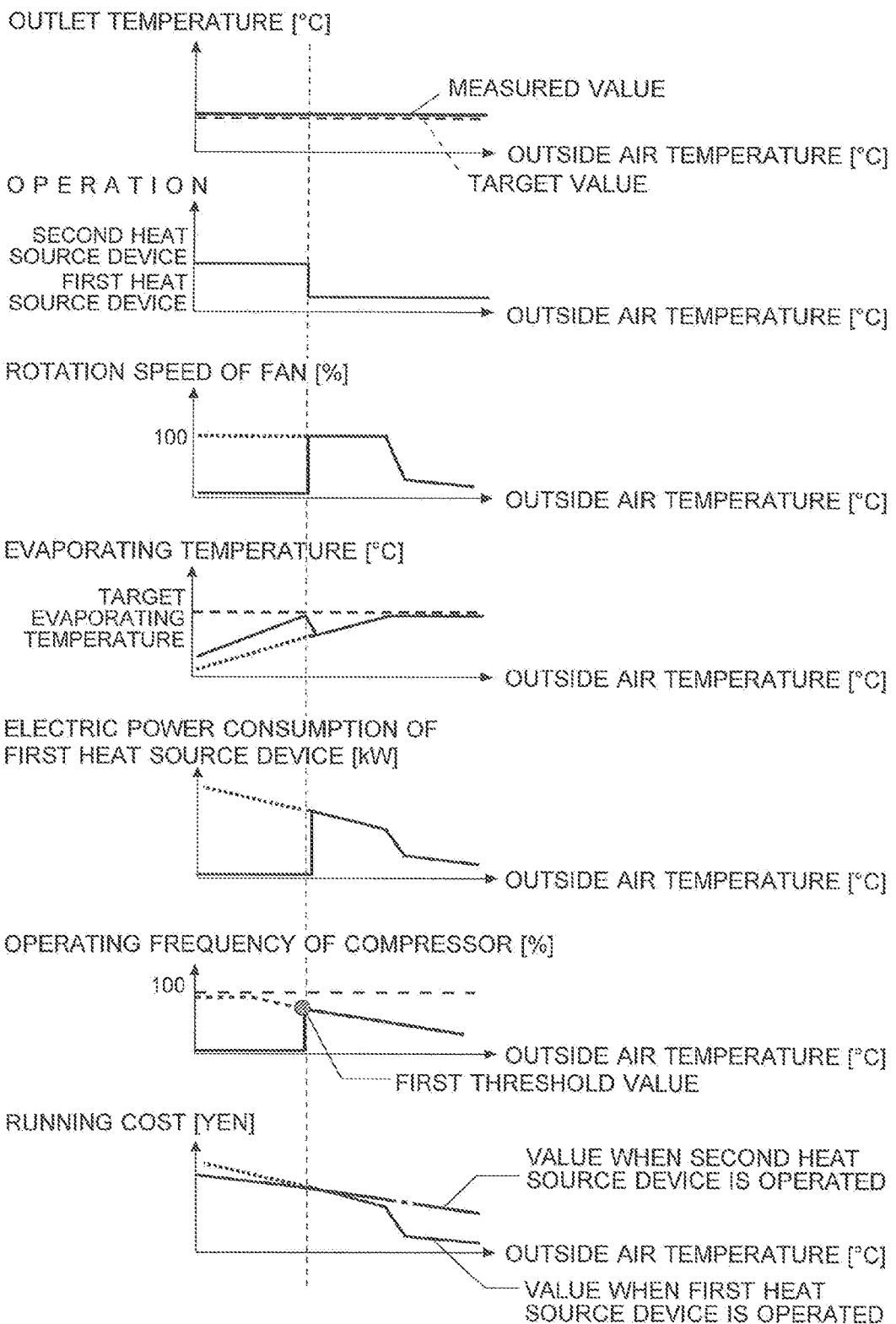
FIG. 10 is graphs for showing operating states of the first heat source device and the second heat source device and the energy consumption parameters in Embodiment 2.

FIG. 10 is graphs for showing operating states of the first heat source device 1 and the second heat source device 2 and the energy consumption parameters in Embodiment 2. FIG. 10 is the same graphs as the graphs of FIG. 5 of Embodiment 1 except that a graph of the operating frequency of the compressor 10 is further included. On the vertical axes of the graphs of FIG. 10, the outlet temperature, switching between the first heat source device 1 and the second heat source device 2, the rotation speed of the fan 14, the evaporating temperature, the electric power consumption of the first heat source device 1, the operating frequency of the compressor 10, and the running cost are indicated in the stated order from the top. As shown in FIG. 10, the operation of the first heat source device 1 and the operation of the second heat source device 2 are switched under a state in which the outlet temperature is kept at the target value.

As described above, the OA being the process air is not heated by the RA. Thus, the heating amount of the first heat source device 1, which is required to increase the outlet temperature to the target value, becomes larger than in Embodiment 1. Therefore, as exemplified in the graph of FIG. 10 for the rotation speed of the fan 14 and the graph of FIG. 10 for the running cost, there may be a range of the outside air temperature in which the running cost is reduced when the first heat source device 1 is operated even after the rotation speed of the fan 14 becomes equal to a maximum value (100%). In consideration of the situation described above, the operating frequency of the compressor 10 is used as the energy consumption parameter in Embodiment 2. The operating frequency of the compressor 10 at a point at which the running cost of the first heat source device 1 and the running cost of the second heat source device 2 become equal to each other is used as the first threshold value for switching the heating operation performed by the first heat source device 1 to the heating operation performed by the second heat source device 2.

A flowchart for illustrating switching control from the first heating operation to the second heating operation of the air-conditioning apparatus 100A according to Embodiment 2 is the same as that of FIG. 4. In Embodiment 2, the energy consumption parameter used in Step S3 of FIG. 4 includes the operating frequency of the compressor 10. The first threshold value being the operating frequency of the compressor 10 is stored in advance in the storage unit 72 or the storage unit 82. A combination of the operating frequency of the compressor 10 and at least one of the rotation speed of the fan 14, the evaporating temperature, the electric power consumption of the first heat source device 1, and the outside air temperature may be used as the energy consumption parameter. In this manner, the functions and the effects that have been described in Embodiment 1 can be obtained at the same time.

Through use of the operating frequency of the compressor 10 as the energy consumption parameter, the first heating operation can be switched to the second heating operation at timing at which the running cost can be maintained in a reduced state. This effect is particularly effective when the increase in operating frequency of the compressor 10 greatly affects the electric power consumption of the first heat source device 1 due to a large heating amount for the process air.

When the total heat exchanger is not provided as in Embodiment 2, the air-conditioning apparatus 100A is not required to include the exhaust air passage 6 and the exhaust air fan 31. When the exhaust air passage 6 and the exhaust air fan 31 are not provided, the ventilating function for exhausting the indoor air to the outdoor space may be achieved by an other device, for example, a ventilating fan. A specific configuration in which the RA is exhausted as the EA is not limited to that exemplified in FIG. 9.

Embodiment 3

While the OA and the RA constantly exchange heat in the total heat exchanger 32 of the air-conditioning apparatus 100 in Embodiment 1, an air-conditioning apparatus 100B according to Embodiment 3 of the present invention is configured so that at least one of the OA and the RA can bypass the total heat exchanger 32. In Embodiment 3, differences from Embodiment 1 are mainly described.

Figure 11:
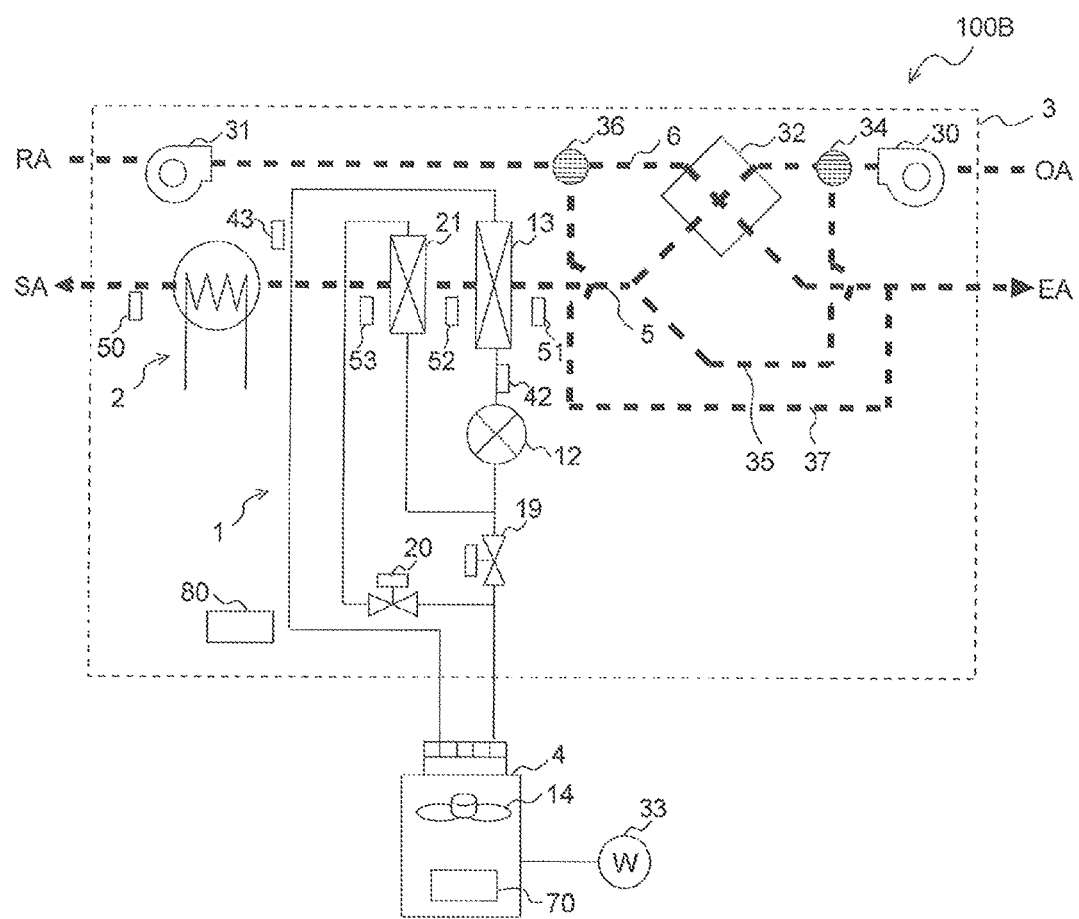
FIG. 11 is a schematic diagram of a system configuration of an air-conditioning apparatus according to Embodiment 3 of the present invention.

FIG. 11 is a schematic diagram of a system configuration of the air-conditioning apparatus 100B according to Embodiment 3. A supply air bypass 35, which branches from the supply air passage 5 at a position on an upstream side of the total heat exchanger 32 and joins the supply air passage 5 at a position on a downstream side of the total heat exchanger 32, is provided to the supply air passage 5 formed inside the use-side casing 3 of the air-conditioning apparatus 100B. The supply air bypass 35 is an air passage bypassing the total heat exchanger 32. At the position on the upstream side of the total heat exchanger 32, at which the supply air bypass 35 branches from the supply air passage 5, a supply air passage switching device 34 is provided. The supply air passage switching device 34 includes a valve configured to close one of the supply air passage 5 and the supply air bypass 35 and open the other thereof. Depending on a state of the valve of the supply air passage switching device 34, any one of the supply air passage 5 and the supply air bypass 35 serves as a flow passage through which the OA flows toward the second heat exchanger 13.

An exhaust air bypass 37, which branches from the exhaust air passage 6 at a position on the upstream side of the total heat exchanger 32 and joins the exhaust air passage 6 at a position on the downstream side of the total heat exchanger 32, is provided to the exhaust air passage 6 formed inside the use-side casing 3. The exhaust air bypass 37 is an air passage bypassing the total heat exchanger 32. An exhaust air passage switching device 36 is provided at the position on the upstream side of the total heat exchanger 32, at which the exhaust air bypass 37 branches from the exhaust air passage 6. The exhaust air passage switching device 36 includes a valve configured to close one of the exhaust air passage 6 and the exhaust air bypass 37 and open the other thereof. Depending on a state of the valve of the exhaust air passage switching device 36, any one of the exhaust air passage 6 and the exhaust air bypass 37 serves as a flow passage through which the RA flows toward the outdoor space.

The supply air passage switching device 34 and the exhaust air passage switching device 36 are controlled by the heat source-side controller 70 or the use-side controller 80.

During a period in which the operation in which the OA and the RA exchange heat in the total heat exchanger 32, the supply air passage switching device 34 closes the supply air bypass 35 and opens the supply air passage 5, which communicates to the total heat exchanger 32. Further, the exhaust air passage switching device 36 closes the exhaust air bypass 37 and opens the exhaust air passage 6, which communicates to the total heat exchanger 32. When the supply air fan 30 and the exhaust air fan 31 are activated under this state, the OA being the process air flows through the supply air passage 5 of the use-side casing 3 to flow into the total heat exchanger 32, and the RA flows through the exhaust air passage 6 to flow into the total heat exchanger 32. In the total heat exchanger 32, the RA and the process air exchange heat. The process air is heated by the RA in the total heat exchanger 32. The process air flowing out of the total heat exchanger 32 passes through the second heat exchanger 13 and the second heat source device 2, and is supplied as the SA to the indoor space. Meanwhile, the RA, which has exchanged heat with the process air in the total heat exchanger 32, is exhausted as the EA to the outdoor space.

During a period in which the operation in which the OA and the RA do not exchange heat in the total heat exchanger 32, the supply air passage switching device 34 opens the supply air bypass 35 and closes the supply air passage 5 which communicates to the total heat exchanger 32. Further, the exhaust air passage switching device 36 opens the exhaust air bypass 37 and closes the exhaust air passage 6 which communicates to the total heat exchanger 32. When the supply air fan 30 is activated under this state, the OA being the process air flows through the supply air passage 5 of the use-side casing 3, passes through the supply air passage switching device 34, and flows through the supply air bypass 35. The process air flowing through the supply air bypass 35 joins the air flowing through the supply air passage 5 on the downstream side of the total heat exchanger 32 and passes through the second heat exchanger 13 and the second heat source device 2 to be supplied as the SA to the indoor space. When the exhaust air fan 31 is activated, the RA flows through the exhaust air passage 6 of the use-side casing 3 and passes through the exhaust air passage switching device 36 to flow through the exhaust air bypass 37. The RA flowing through the exhaust air bypass 37 joins the air flowing through the exhaust air passage 6 on the downstream side of the total heat exchanger 32 to be exhausted as the EA to the outdoor space.

In Embodiment 3, there is described an example in which the bypasses for bypassing the total heat exchanger 32 are provided to both the supply air passage 5 and the exhaust air passage 6. However, the bypass for bypassing the total heat exchanger 32 may only be provided to any one of the supply air passage 5 and the exhaust air passage 6. In this manner, any one of the OA and the RA bypasses the total heat exchanger 32. Thus, a configuration in which the OA and the RA do not exchange heat can be obtained.

Figure 12:
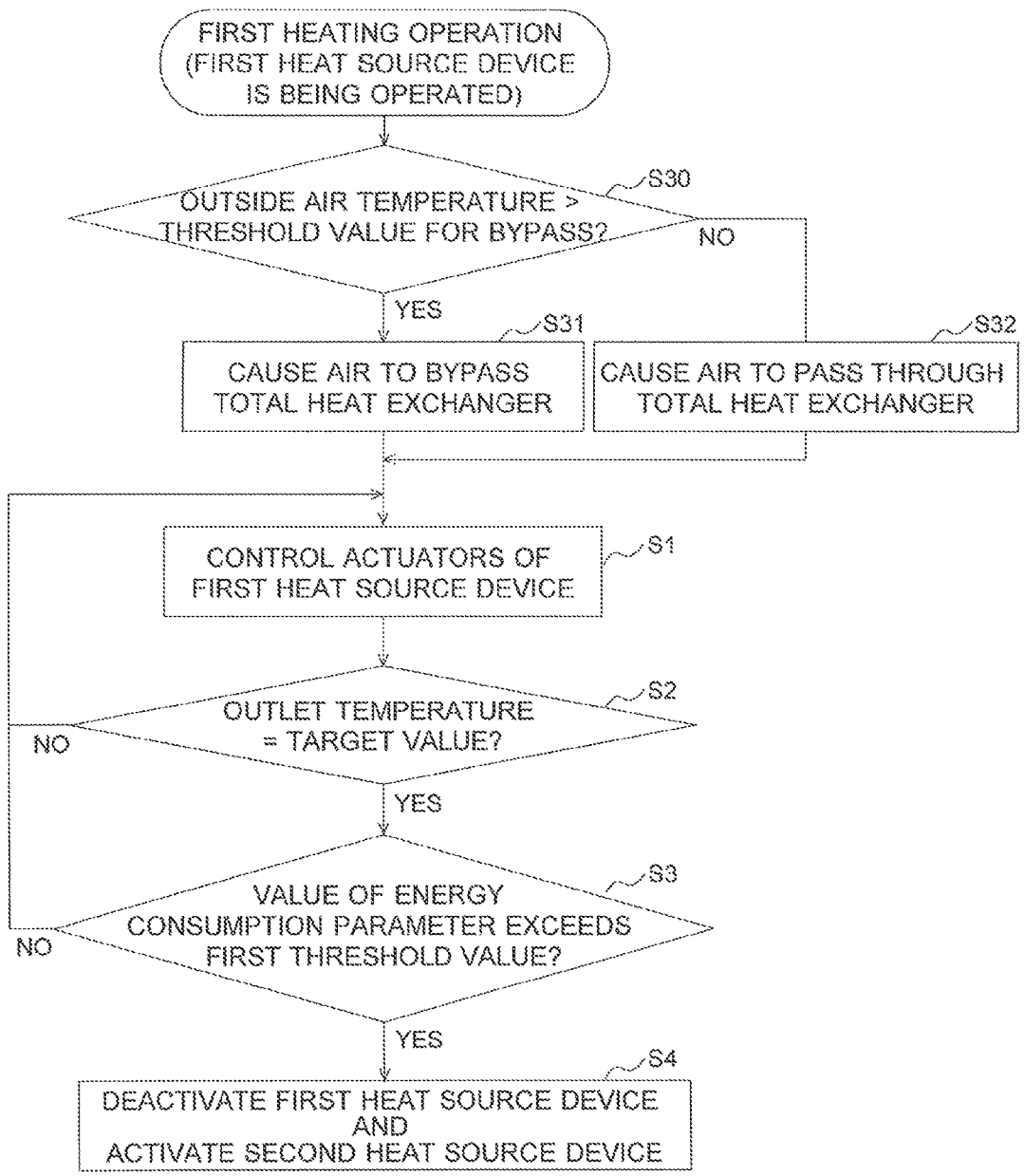
FIG. 12 is a flowchart for illustrating switching control from the first heating operation to the second heating operation in the air-conditioning apparatus according to Embodiment 3.

FIG. 12 is a flowchart for illustrating switching control from the first heating operation to the second heating operation in the air-conditioning apparatus 100B according to Embodiment 3. Processing performed in Steps S1 to S4 of FIG. 12 is the same as the processing performed in Steps S1 to S4 of FIG. 4. Therefore, Steps S30 to S32 are mainly described below.

During the period in which the first heating operation for heating the process air is being performed by the first heat source device 1, the outside air temperature is compared to a threshold value for bypass (Step S30). The outside air temperature is the ambient temperature of the first heat exchanger 11 (see FIG. 2) of the first heat source device 1, which is detected by the temperature sensor 47. The threshold value for bypass is stored in the storage unit 72 or the storage unit 82 (see FIG. 3).

When the outside air temperature is higher than the threshold value for bypass (YES in Step S30), the OA and the RA are caused to bypass the total heat exchanger 32. Specifically, the supply air passage switching device 34 and the exhaust air passage switching device 36 are controlled so that the OA flows through the supply air bypass 35 and the RA flows through the exhaust air bypass 37. Meanwhile, when the outside air temperature is equal to or lower than the threshold value for bypass (NO in Step S30), the supply air passage switching device 34 and the exhaust air passage switching device 36 are controlled so that the OA and the RA pass through the total heat exchanger 32. When the outside air temperature is higher than the threshold value for bypass, the OA and the RA are caused to bypass the total heat exchanger 32. When the outside temperature is not higher than the threshold value for bypass, the OA and the RA exchange heat in the total heat exchanger 32.

After it is determined whether or not to cause the OA and the RA to bypass the total heat exchanger 32, the processing in Steps S1 to S4 is performed.

As described above, in Embodiment 3, during the period in which the first heating operation is being performed, the air passage passing through the total heat exchanger 32 and the air passage bypassing the total heat exchanger 32 are switched in accordance with the outside air temperature. When the outside air temperature is equal to or lower than the threshold value for bypass, the air passage passing through the total heat exchanger 32 is used. When the outside air temperature is higher than the threshold value for bypass, the air passage bypassing the total heat exchanger 32 is used. In winter, which is a period during which the outside air temperature is sufficiently low, a temperature difference between the RA having an increased temperature by heating and the OA being the process air is large, and therefore the OA being the process air is preheated with the RA in the total heat exchanger 32. As a result, a great effect of reducing the heating amount provided by the first heat source device 1 is obtained. Meanwhile, in an intermediate period between summer and winter, which is a period during which the outside air temperature is not low, the temperature difference between the RA and the OA is relatively small. Thus, a degree of preheating of the OA with the RA in the total heat exchanger 32 is small. As a pressure loss is also generated in the total heat exchanger 32 when the OA and the RA are caused to pass through the total heat exchanger 32, the electric power consumptions of the supply air fan 30 and the exhaust air fan 31 become larger as compared to a case in which the OA and the RA are caused to bypass the total heat exchanger 32. Then, when the air-conditioning apparatus 100B is operated with large electric power consumptions of the supply air fan 30 and the exhaust air fan 31 even though a preheating effect on the OA in the total heat exchanger 32 is low, an increase in running cost of the first heat source device 1 is brought about.

In view of the above, in Embodiment 3, the outside air temperature and the threshold value for bypass are compared to each other. In the intermediate period, which is the period during which the outside air temperature becomes higher than the threshold value for bypass, the air is caused to bypass the total heat exchanger 32. In this manner, the running cost in the intermediate period can be kept low. Further, in winter, which is the period during which the outside air temperature becomes equal to or lower than the threshold value for bypass, the OA being the process air is preheated by using the total heat exchanger 32 to reduce the heating amount of the first heat source device 1. As a result, the running cost in winter can be kept low.

Embodiment 4

While the supply air passage 5 and the exhaust air passage 6 are provided in the use-side casing 3 in Embodiments 1 to 3, the two systems of air passages are not provided in an air-conditioning apparatus 100C according to Embodiment 4 of the present invention. In Embodiment 4, there is provided an air passage in which the process air taken into the use-side casing 3 as the RA is air-conditioned so as to be supplied as the SA to the indoor space. Specifically, the air-conditioning apparatus 100C according to Embodiment 4 does not have a ventilating function. In Embodiment 4, differences from Embodiment 1 are mainly described.

Figure 13:
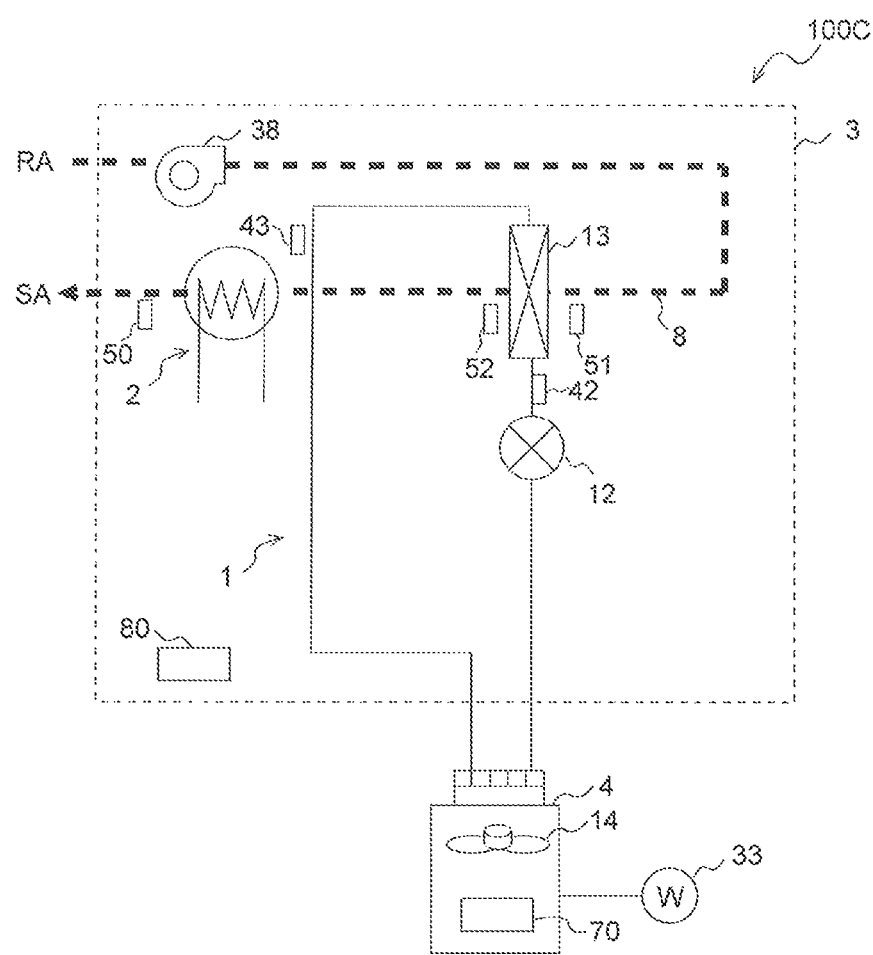
FIG. 13 is a schematic diagram of a system configuration of an air-conditioning apparatus according to Embodiment 4 of the present invention.

FIG. 13 is a schematic diagram of a system configuration of the air-conditioning apparatus 100C according to Embodiment 4. In the air-conditioning apparatus 100C, an air passage 8 is provided in the use-side casing 3. The air passage 8 is an air passage through which the RA taken from the indoor space into the use-side casing 3 is supplied to the indoor space via the second heat exchanger 13 and the second heat source device 2. In Embodiment 4, the RA is the process air to be heated or cooled in the first heat source device 1 and the second heat source device 2.

The first heat source device 1 of Embodiment 4 does not include the first solenoid valve 19, the second solenoid valve 20, and the third heat exchanger 21, which are provided in Embodiment 1.

Even in Embodiment 4, the cooling operation, the first heating operation, the second heating operation, and the defrosting operation, which have been described in Embodiment 1, are performed. Specifically, the control that has been described with reference to FIG. 4, FIG. 6, and FIG. 7 can be applied to a system of Embodiment 4, and similar functions and effects can be obtained from this system. Further, the control that has been described with reference to FIG. 7 of Embodiment 2 can be applied to a system of Embodiment 4, and similar functions and effects can be obtained from this system.

Further, in Embodiment 4, the RA is the process air as described above. Therefore, the operating frequency of the compressor 10 of the first heat source device 1 and the heating amount of the second heat source device 2 can be controlled so that the detection value of the temperature sensor 51 configured to detect the air temperature on the upstream side of the second heat exchanger 13 becomes equal to the target value. The first heat source device 1 and the second heat source device 2 may be controlled so that the detection value of the temperature sensor 50 configured to detect the outlet temperature becomes equal to the target value, as in Embodiment 1.

REFERENCE SIGNS LIST

1 first heat source device 2 second heat source device 3 use-side casing 4 heat source-side casing 5 supply air passage 6 exhaust air passage 8 air passage 10 compressor 11 first heat exchanger 12 decompression mechanism 13 second heat exchanger 14 fan 15 four-way valve 16 accumulator 17 subcooling heat exchanger 18 decompression mechanism 19 first solenoid valve 20 second solenoid valve 21 third heat exchanger 22 subcooling circuit 23 reheating circuit 30 supply air fan 31 exhaust air fan 32 total heat exchanger 33 power meter 34 supply air passage switching device 35 supply air bypass 36 exhaust air passage switching device 37 exhaust air bypass 40 temperature sensor 41 temperature sensor 42 temperature sensor 43 temperature sensor 44 temperature sensor 45 temperature sensor 46 temperature sensor 47 temperature sensor 50 temperature sensor 51 temperature sensor 52 temperature sensor 53 temperature sensor 60 pressure sensor 61 pressure sensor 70 heat source-side controller 71 processor 72 storage unit 73 communication unit 80 use-side controller 81 processor 82 storage unit 83 communication unit 100 air-conditioning apparatus 100A air-conditioning apparatus 100B air-conditioning apparatus 100C air-conditioning apparatus

The invention claimed is:

1. An air-conditioning apparatus, comprising:
   a vapor-compression refrigeration circuit configured to transfer heat to process air;
   a heater configured to transfer heat to the process air, wherein the heater is different from the vapor-compression refrigeration circuit; and
   a controller configured to control the vapor-compression refrigeration circuit and the heater,
   wherein the controller is configured to deactivate the vapor-compression refrigeration circuit and activate the heater when, during a period in which the vapor-compression refrigeration circuit is being operated to heat the process air, a temperature of the heated process air is kept at a target temperature and a parameter indicating an energy consumption of the vapor-compression refrigeration circuit exceeds a first threshold value.

2. The air-conditioning apparatus of claim 1, wherein:
   the vapor-compression refrigeration circuit includes a compressor, a first heat exchanger, a decompression mechanism, a second heat exchanger, and a fan configured to send air to the first heat exchanger;
   the compressor, the first heat exchanger, the decompression mechanism, and the second heat exchanger are connected to form the vapor-compression refrigeration cycle; and
   during the period in which the vapor-compression refrigeration circuit is being operated to heat the process air, refrigerant discharged from the compressor heats the process air at the second heat exchanger, and the air supplied from the fan evaporates the refrigerant passing through the first heat exchanger.

3. The air-conditioning apparatus of claim 2, wherein the parameter indicating the energy consumption includes a rotation speed of the fan.

4. The air-conditioning apparatus of claim 2, wherein the parameter indicating the energy consumption includes an evaporating temperature of the refrigerant passing through the first heat exchanger.

5. The air-conditioning apparatus of claim 2, further comprising a power meter configured to measure an electric power consumption of the vapor-compression refrigeration circuit,
   wherein the parameter indicating the energy consumption includes the electric power consumption measured by the power meter.

6. The air-conditioning apparatus of claim 2, further comprising a temperature sensor configured to detect an ambient temperature of the first heat exchanger,
   wherein the parameter indicating the energy consumption includes the ambient temperature detected by the temperature sensor.

7. The air-conditioning apparatus of claim 2, wherein the parameter indicating the energy consumption includes an operating frequency of the compressor.

8. The air-conditioning apparatus of claim 1, wherein the first threshold value comprises a value at which a running cost for an operation of the heater becomes smaller than a running cost for an operation of the vapor-compression refrigeration circuit.

9. The air-conditioning apparatus of claim 1, further comprising a total heat exchanger configured to allow the process air and exhaust air to be exhausted to an outdoor space to totally exchange heat therebetween.

10. The air-conditioning apparatus of claim 9, wherein the total heat exchanger comprises one of a rotary total heat exchanger and a static total heat exchanger.

11. The air-conditioning apparatus of claim 9, wherein the controller is configured to switch, based on an outside air temperature, between an operation in which the process air and the exhaust air to be exhausted to the outdoor space totally exchange heat therebetween in the total heat exchanger and an operation in which the process air and the exhaust air to be exhausted to the outdoor space do not totally exchange heat therebetween in the total heat exchanger.

12. The air-conditioning apparatus of claim 1, wherein the controller is configured to deactivate the heater and activate the vapor-compression refrigeration circuit when an outside air temperature is higher than a second threshold value during a period in which the heater is being operated.

13. The air-conditioning apparatus of claim 1, wherein, when a defrosting operation is performed with the vapor-compression refrigeration circuit, the controller is configured to activate the heater after the defrosting operation is terminated.

14. The air-conditioning apparatus of claim 13, further comprising a memory configured to store a value of an outside air temperature when the defrosting operation is started,
wherein the controller is configured to deactivate the heater and activate the vapor-compression refrigeration circuit when a detected outside air temperature is higher than the value stored in the memory during a period in which the heater is being operated.

15. The air-conditioning apparatus of claim 1, further comprising one of an air passage configured to guide indoor air to the vapor-compression refrigeration circuit and the heater and an air passage configured to guide outdoor air to the vapor-compression refrigeration circuit and the heater.

16. The air-conditioning apparatus of claim 1, further comprising a memory configured to store a unit energy cost of the vapor-compression refrigeration circuit and a unit energy cost of the heater,
wherein the controller is configured to determine the first threshold value based on the unit energy cost of the vapor-compression refrigeration circuit and the unit energy cost of the heater.

17. The air-conditioning apparatus of claim 16, wherein:
the unit energy cost of the vapor-compression refrigeration circuit and the unit energy cost of the heater are stored in the memory for each country of a plurality of countries or for each of several preset regions of a country; and
the controller is configured to select, based on one of a country and a region in which the air-conditioning apparatus is installed, the unit energy cost of the vapor-compression refrigeration circuit and the unit energy cost of the heater to be used to determine the first threshold value.

* * * * *